(12) United States Patent
Kim

(10) Patent No.: US 9,225,678 B1
(45) Date of Patent: Dec. 29, 2015

(54) COMPUTER IMPLEMENTED METHOD AND SYSTEM FOR SOCIAL NETWORK SERVICE

(71) Applicant: HEALING AD Co., Ltd., Seoul (KR)

(72) Inventor: Kyoung Jun Kim, Seoul (KR)

(73) Assignee: HEALING AD Co., Ltd., Seoul (KR)

( * ) Notice: Subject to any disclaimer, the term of this patent is extended or adjusted under 35 U.S.C. 154(b) by 0 days.

(21) Appl. No.: 14/523,671

(22) Filed: Oct. 24, 2014

(51) Int. Cl.
*G06K 5/00* (2006.01)
*H04L 12/58* (2006.01)
*G06Q 50/00* (2012.01)

(52) U.S. Cl.
CPC ............. *H04L 51/32* (2013.01); *G06Q 50/01* (2013.01)

(58) Field of Classification Search
CPC ........... G06K 5/00; G06K 7/10; G06K 19/00; G06F 17/00
USPC .................................. 235/380, 375, 487, 377
See application file for complete search history.

(56) References Cited

U.S. PATENT DOCUMENTS

| 2013/0174223 A1* | 7/2013 | Dykeman et al. ................. 726/4 |
| 2013/0311572 A1 | 11/2013 | Faller et al. |
| 2014/0059139 A1* | 2/2014 | Filev et al. .................... 709/205 |

* cited by examiner

*Primary Examiner* — Edwyn Labaze
(74) *Attorney, Agent, or Firm* — Novick, Kim & Lee, PLLC; Jae Youn Kim; Sang Ho Lee

(57) ABSTRACT

A computer implemented method is provided. The computer implemented method includes receiving a request from a user of the social networking system to select a first post, receiving a first range from the user, providing a first group of content including the first post, and a first plurality of content items posted before the first post for a period of time of the first range, identifying a second post of the social networking system according to a predetermined criteria, identifying a second group of content items including the second post, and a second plurality of content items posted before the second post for a period of time of the first range, and displaying at least one of the first group of content items and the second group of content items on a display device.

18 Claims, 23 Drawing Sheets

COMPUTER IMPLEMENTED METHOD AND SYSTEM FOR SOCIAL NETWORK SERVICE

FIELD OF THE INVENTION

The present disclosure relates generally to social networking services, and more particularly to facilitating a comparison among a plurality of posted content items between past and present.

BACKGROUND OF THE INVENTION

Social networks, or communities of entities that share interests or activities or are interested in exploring the interests of other entities, have become more prevalent. Particularly, social networking service ("SNS") applications on smartphones or a website have allowed users or entities to more efficiently communicate information among each other. For example, a user may post contact information, background information, job information, hobbies or other user-specific data to a SNS application on smartphones or a website. Other users or entities can then review the individually posted content items.

Using various SNS communication channels, users of a social networking system increase their interaction with each other and engage with the social networking system on a more frequent basis. One type of communication channel is a news feed "stream" in which a user is presented with a series of content items that are posted, uploaded, or otherwise provided to the social networking system from one or more users of the service. The news feed stream may be updated as content items are added to the stream by users. Although news feed of a SNS offers users the opportunity for frequent, automatic updates of the information posted by other users, after a period of time, a post in which a user is interested may be buried in all other content items because the user of the SNS receives a volume of content items. When the user desires to search an old post and makes some comparison with a present one, the user needs to find both of content items on the SNS. For instance, it could be difficult for the user to see Christmas pictures of this year and previous year together on a SNS timeline.

There are existing mechanisms that allow a user to locate old information. Some mechanisms may allow the user to scroll the screen for finding the past content items. Typically, however, these finding options are disparate and disorganized. In other words, the user must spend time for searching, identifying, and reading old content items that are not presented in a coherent, consolidated manner. Often, many of the news are not relevant to the user. Just as often, the user remains unaware of the existence of some news items that were not captured in the user's research. According to a user's need, a new way of searching, organizing, and displaying old content items and presenting content items are needed.

SUMMARY OF THE INVENTION

In view of the aforementioned needs, the present disclosure provides a computer implemented method. According to one embodiment of the present invention, the computer implemented method includes receiving a request from a user of a social networking system to select a first post, receiving a first range from the user, providing a first group of content items having the first post, and a first plurality of content items posted before the first post for a period of time of the first range, identifying a second post of the social networking system according to a predetermined criteria, identifying a second group of content items having the second post, and a second plurality of content items posted before the second post for a period of time of the first range, and displaying at least one of the first group of content items and the second group of content items on a display device.

The predetermined criteria may include a date difference between the first post and the second post. The second post may have a posting date earlier than that of the first post. Each of the first group of content items and each of the second group of content items may be rearranged according to a time difference with a posting date of the first post. The predetermined criteria may include whether the first post and the second post are related to an event that periodically occurs but does not have a fixed date. Each of the first post and the second post may have same month and date. Each of the first post and the second post may have a different date one another.

According to another embodiment of the present invention, the computer implemented method may include receiving a request from a first user of a first social networking system to create a card, creating the card comprising a plurality of card content items, wherein each of the card content items is posted by at least one member from at least one of social networking systems, communicating with a second user of the first social networking system using the card, and receiving a feedback on the card from the second user.

The receiving of the feedback from the second user may include at least one of liking the card, receiving the second user's feeling on the card, commenting on the card, sharing the card with a third user, and following an update of the card.

In another embodiment, the first user may input a first search condition in the card, and the card collects card content items in accordance with the first search condition among content items posted by the at least one member, and the card content items in accordance with the first search condition is displayed to the second user who follows the card. The first user can change the first search condition to a second search condition in the card, and the card collects card content items in accordance with the second search condition among content items posted by the at least one member, and the card content items in accordance with the second search condition is displayed to the second user who follows the card. The second user may suggest a change to the first search condition in the card to the first user, and the first user either approves or disapproves the suggestion. The second user may suggest a change to the first search condition in the card to the first user, and such suggestion is disclosed to other members for a vote and if the vote is met to a predetermined condition, the suggestion of the second user is approved. The second user can add a second search condition in the card, and the card collects card content items in accordance with the first or second search conditions among content items posted by the member and the card content items in accordance with the first and second search conditions are displayed to the second user who follows the card. A third user can block the second search condition and use the first search condition in the card, and the card collects card content items in accordance with the first condition among content items posted by the member and the card content items in accordance with the first condition are displayed to the third user who follows the card.

In another embodiment, a second level card may be created by the first user, which includes a plurality of cards, and the first user communicates with the second user using the second level card and the second user can like, share, follow, or comment on the second level card.

In another embodiment, the first user may input a first search condition in the card that when any card content items includes an indication of future date and the future date is reached, the searched card content item is displayed to the card. The first user can set a privacy setting on the card content items and the card content item is not disclosed to except the first user.

In another embodiment, a social network service system is provided. The social network service system includes an interface unit configured to interact with a user's terminal and dispatching a requested information to the user's terminal in a format that can be displayed to the user's terminal, a card unit managing a card generation process, wherein the card comprises a plurality of content items from a plurality of members, and another user can like, share, follow, or comment on the card, a network unit configured to manage network communications in which streams of data frames are transmitted and received from and to a plurality of electronic components of another social network service systems, and a memory unit that can stores programs or data on a temporary or permanent basis.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE PREFERRED EMBODIMENT

Figure 1A:
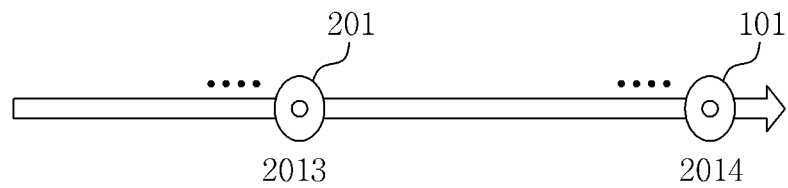
FIG. 1A illustrates a conventional timeline with content items that are sequentially displayed in a SNS.

Reference will now be made in detail to embodiments, examples of which are illustrated in the accompanying drawings, wherein like reference numerals refer to the like elements throughout the several views. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the disclosure. The terms "comprises" and/or "comprising" are used to specify the presence of stated elements, steps, operations, and/or components, but do not preclude the presence or addition of one or more other elements, steps, operations, and/or components. The terms "first," "second," and the like may be used to describe various elements, but do not limit the elements. Such terms are only used to distinguish one element from another.

As used herein, a "user" can be an individual or an entity (such as a business or third party application). The term "connection" refers to individuals and entities with which a user of the social networking service ("SNS") may form a connection, association, or other relationship. A SNS, for instance, includes Facebook, Twitter, Instagram, or Kakaotalk. A plural number of social networking services can be collectively called "SNSs." Users of a SNS may form connections, associations, or other relationships with other users based on real-life interactions, online interactions, or a mixture of both. For example, users may be from the same geographic location, may travel in the same circle of friends, or may have attended the same college or university. Content items posted by a user may be made available to the user's connections via one or more of various communication channels in SNSs. "Posting(s)," "post(s)", or "content item(s)" can be interchangeably used to refer to an online content that a user or other users made or updated on the SNS. "Posting(s)," "post(s)", or "content item(s)" may include any type of media content, such as status updates or other textual messages, location information, photos, videos, advertisements, and links. Content items represent pieces of content that are represented as objects in the social networking system.

A SNS offers its users the ability to communicate and interact with other users of the social networking system. In use, users join the SNS and then connect with other users, individuals, and entities to which they desire to be connected. Connections may be added explicitly by a user, for example, by selecting another particular user to be a friend, or automatically created by the social networking system based on common characteristics of the users (e.g., users who are alumni of the same educational institution).

In addition to interactions with other users, the social networking system provides users with the ability to take actions on various types of items supported by the service. These items may include groups or networks (where "networks" here refer not to physical communication networks, but rather social networks of people) to which users of the service may be interested in events or calendar entries in which a user might be interested. These are just a few examples of the items upon which a user may act on a social networking system, and many others are possible. Though many of the embodiments and examples provided herein are directed to particular embodiments of a social networking system, other embodiments may include other environments involving different types of social networks, social content, and other types of websites and communication mechanisms.

User generated content items enhance the user experience on the social networking system. In this way, users of a social networking system are encouraged to communicate with each other by "posting" content items of various types of media through various SNS communication channels.

Figure 1B:
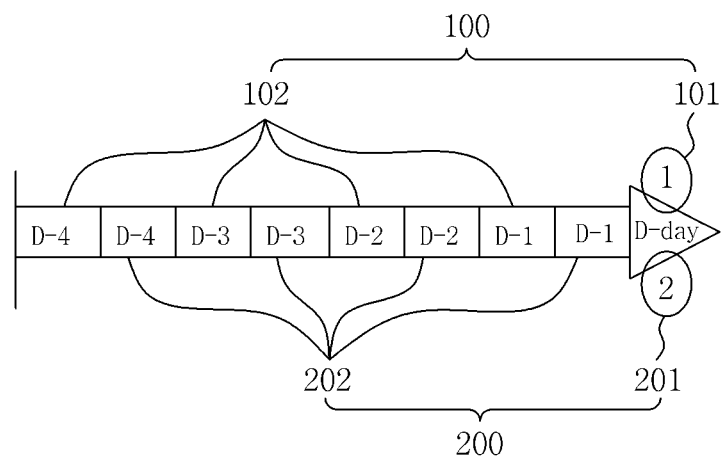
FIG. 1B illustrates rearranged content items on a timeline of a SNS according to one embodiment of the present invention.

Referring to FIGS. 1A and 1B, one embodiment of the present invention will be described. FIG. 1A illustrates a conventional timeline with content items that are sequentially displayed in a SNS. FIG. 1B illustrates rearranged content items on a timeline of the SNS according to one embodiment of the present invention. A conventional SNS offers a service collecting a plurality of content items and presenting the content items on a news feed in a chronological streaming of content items. The news feed stream may be updated as content items are added to the stream. Thus, after a certain period of time, old post is buried in all other content items, and virtually it becomes difficult to find or view the old post again. According to one embodiment of the present invention, IMYMI SNS is provided. IMYMI SNS allows to rearrange old posts and recent posts in a better way to display them together. For instance, if the old post is associated with annually occurring events, IMYMI SNS offers to make comparison the old post with recent content items related to the same events.

Users interact with IMYMI SNS using user's terminal. The user's terminal used by a user for interacting with the IMYMI SNS may be any computing device with a screen and network communication capability such as a personal computer (PC), a desktop computer, a laptop computer, a notebook, a tablet PC, a personal digital assistant (PDA), a mobile telephone, a smartphone, or an internet tablet. These devices or terminal may include a camera sensor that allows image and video content items to be captured and uploaded to IMYMI SNS. These devices or terminal may also have a touch screen, gesture recognition system, mouse pad, or other technology that allows a user to interact with the social networking system through a user interface provided by IMYMI SNS.

Referring to FIG. 1A, a first post 101 is posted in 2014 and a second post 201 was posted in 2013. An ordinary user tends to view the recent content items only, and the old content item receives less attention. However, according to one embodiment of the present invention as shown in FIG. 1B, the first post 101 and second post 201 can be rearranged on a timeline of the SNS. Thus, the user can enjoy viewing both of first post 101 and second post 201.

In another embodiment of the present invention, IMYMI SNS is configured to receive a first time range from a user of a social networking system. The first time range includes a first reference time point. Here, the first time range is five (5) days. The first reference time point is a D-day 101. IMYMI SNS receives at least one comparison time range. Each of the at least one comparison time range includes a comparison time point. Here, the at least one comparison time range is also five (5) days. The second reference time point is another D-day 201. IMYMI SNS identifies a first group comprising a plurality of first content items posted during the first time range that are denoted in FIG. 1B as D-day, D-1, D-2, D-3, and D-4. IMYMI SNS also identifies at least one comparison group, each of the at least one comparison group comprising a plurality of comparison content items posted during the corresponding comparison time range, in which also depicted as D-day, D-1, D-2, D-3, and D-4. IMYMI SNS calculates a first time difference between each content item of the first group and the first reference time point and calculates at least one comparison time difference between each content item of the at least one comparison group and the comparison time point. IMYMI SNS rearranges each content item of the first group away from the first reference time point at the first time difference and rearranges each content item of the at least one comparison group away from the first reference time point at the at least one comparison time difference. IMYMI SNS displays the rearranged each content item of the first group and the rearranged each content item of the at least one comparison group on a display panel.

The first reference time point and the comparison time point may have a same date but a different year. The first reference time point and the comparison time point may have different dates and years.

The first time range and the at least one comparison time range may have a same time period. Alternatively, the first time range and the at least one comparison time range may have a different time period.

Referring to FIG. 1B, the embodiment of the present invention will be further described. IMYMI SNS displays a first group of content items 100 on a timeline. The first group of content items 100 includes a first plurality of content items 102 and the first post 101. A user, for instance, can select at least one first post 101 as a reference time point. Here, for an exemplary purpose, a filing date of the first post 101 is used as a reference time point but not limited thereto. For an example, a reference time point can be in a form of any date or time. For another example, two days before the Christmas day could be used as a referent time point. A user determines a first range. The first range is a number of days or a period of time that the user would like to view along with the first post 101. The first group of content items 100 includes the first plurality of content items 102 during the first range including the first post 101. Here, for instance, a user selects the first post 101 of Sep. 5, 2014 and sets the first range from Sep. 1, 2014 to Sep. 5, 2014. The first plurality of content items 102 are content items posted for five (5) days on and before the first post 101 is posted. The first plurality of content items 102 includes dates denoted in FIG. 1B as D-1, D-2, D-3, and D-4 and the first post 101. The first plurality of content items 102 can be rearranged with respect to a reference time point, the first post 101.

IMYMI SNS also rearranges and displays a second group of content items 200 on a timeline. The second group of content items 200 includes a second plurality of content items 202 including a second post 201. As the first post 101 is selected by the user, the second post 201 can be identified according to a predetermined criteria. Once the second post 201 is decided, the second post 201 can be relocated and be used as a reference time point. In other words, the second post 201 is relocated at a position of the first post 101 and is used as a reference for rearranging the second plurality of content items 202. The predetermined criteria will be described in detail below. The second post 201, for instance, may be content items posted a year before the first post 101 is posted. The second plurality of content items 202 are content items posted during the first range including the second post 201. Since the first range is five (5) days, the second plurality of content items 202 are content items posted for five (5) days including the second post 201. The second plurality of content items 202 includes dates denoted in FIG. 1B as D-1, D-2, D-3, and D-4, and the second post 201. In one embodiment, IMYMI SNS displays at least one of the first group of content items and the second group of content items on a display device along a timeline. The second plurality of content items 202 can be rearranged with respect to a reference time point, the second post 201. Then, the first and second plurality of content items 102 and 202 are displayed altogether so that a user can easily compare one another.

The first time difference can be recalculated in a proportion to a ratio of the first time difference to a total period of the first time range, and the comparison time point can be recalculated in a proportion to a ratio of the the comparison time point to a total period of the at least one comparison time range. For instance, a user can desire to make a comparison between a first event (not shown) and a second event (not shown). The first event (not shown) lasts for 3 days and the second event (not shown) lasts for 7 days. Regarding the first event (not shown), the total period of the first time range is 3 days. The time difference for the second (2) day of the first event has a same time difference for the fourth (4) day of the second event because each of time differences is recalculated in a proportion to a ratio of the time difference to a total period of the time range.

Figure 2A:
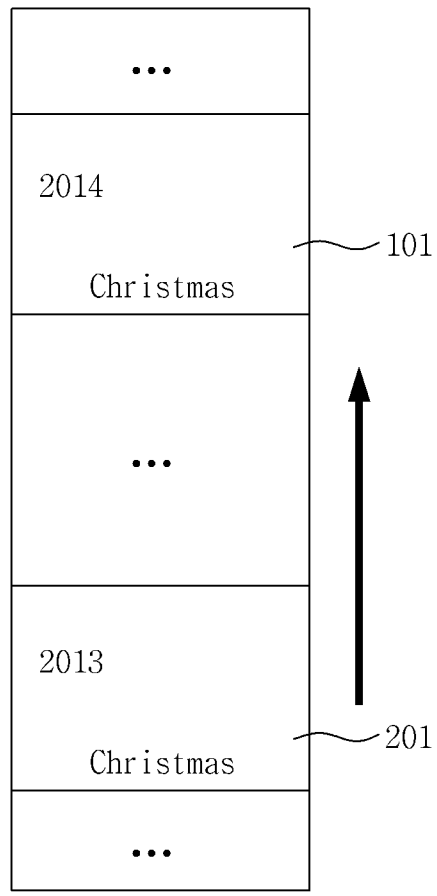
FIG. 2A illustrates a conventional timeline with content items that are sequentially displayed in the SNS.
Figure 2B:
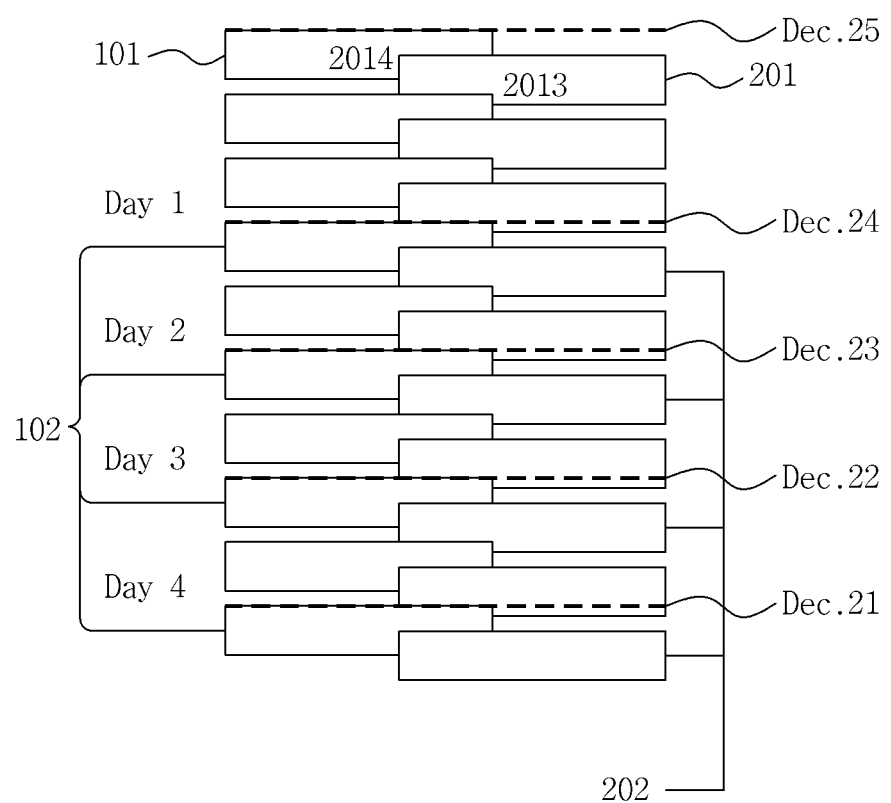
FIG. 2B illustrates rearranged content items on a timeline of the SNS according to another embodiment of the present invention.
Figure 3:
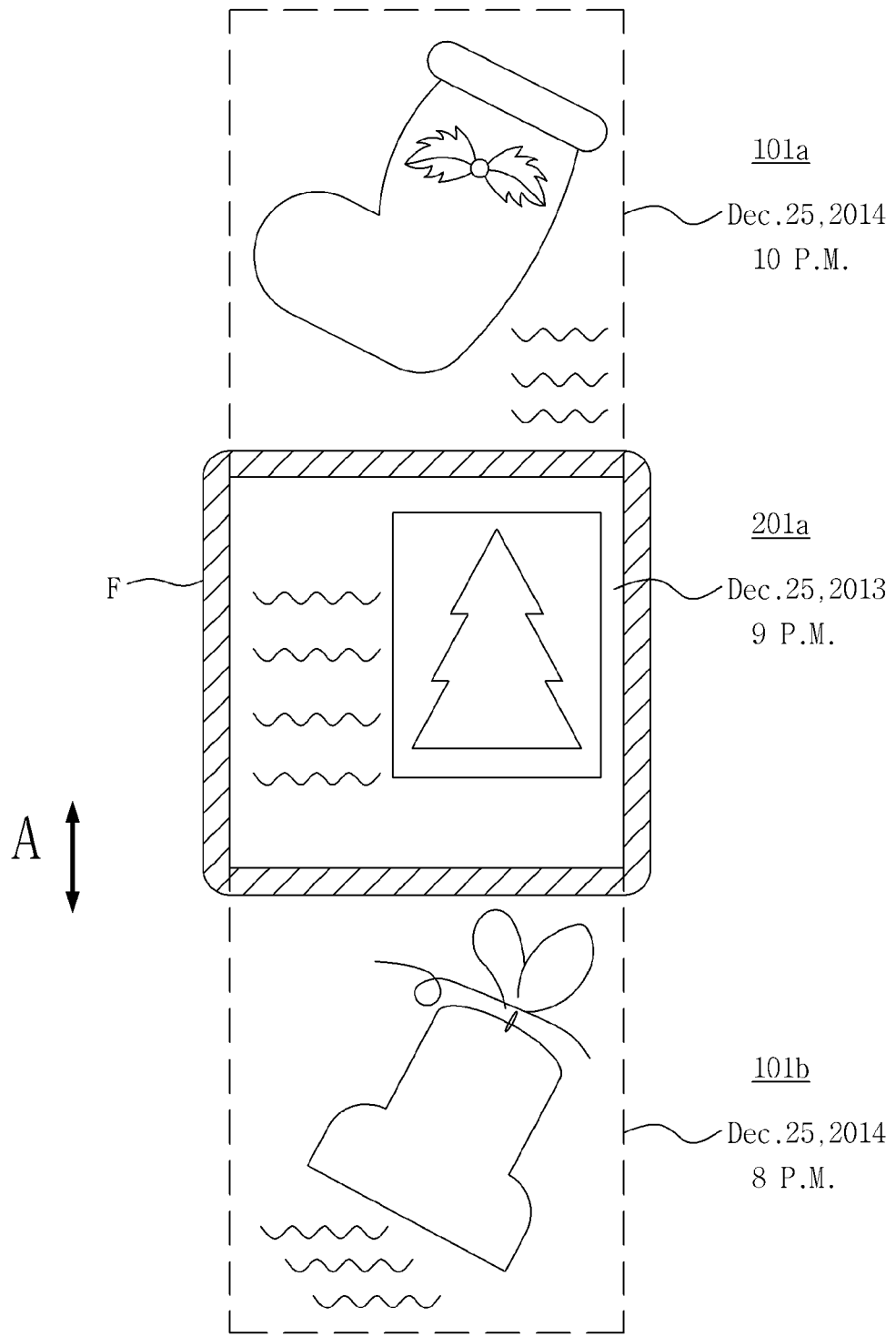
FIG. 3 illustrates rearranged content items having a same date on a timeline, in which one of the content item is visible on the mobile device, according to another embodiment of the present invention.
Figure 4:
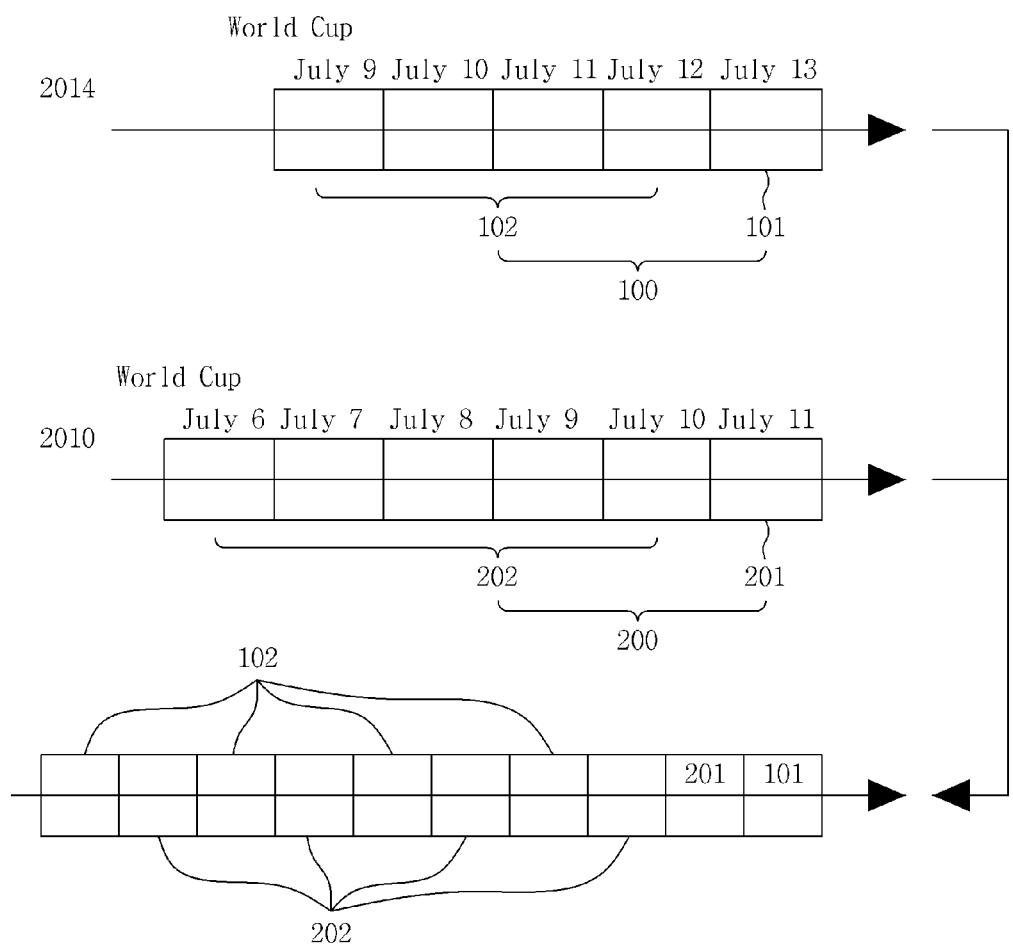
FIG. 4 illustrates how to rearrange World Cup content items, periodically occurring but not having a fixed date, on a timeline of the SNS according to the other embodiment of the present invention.
Figure 5:
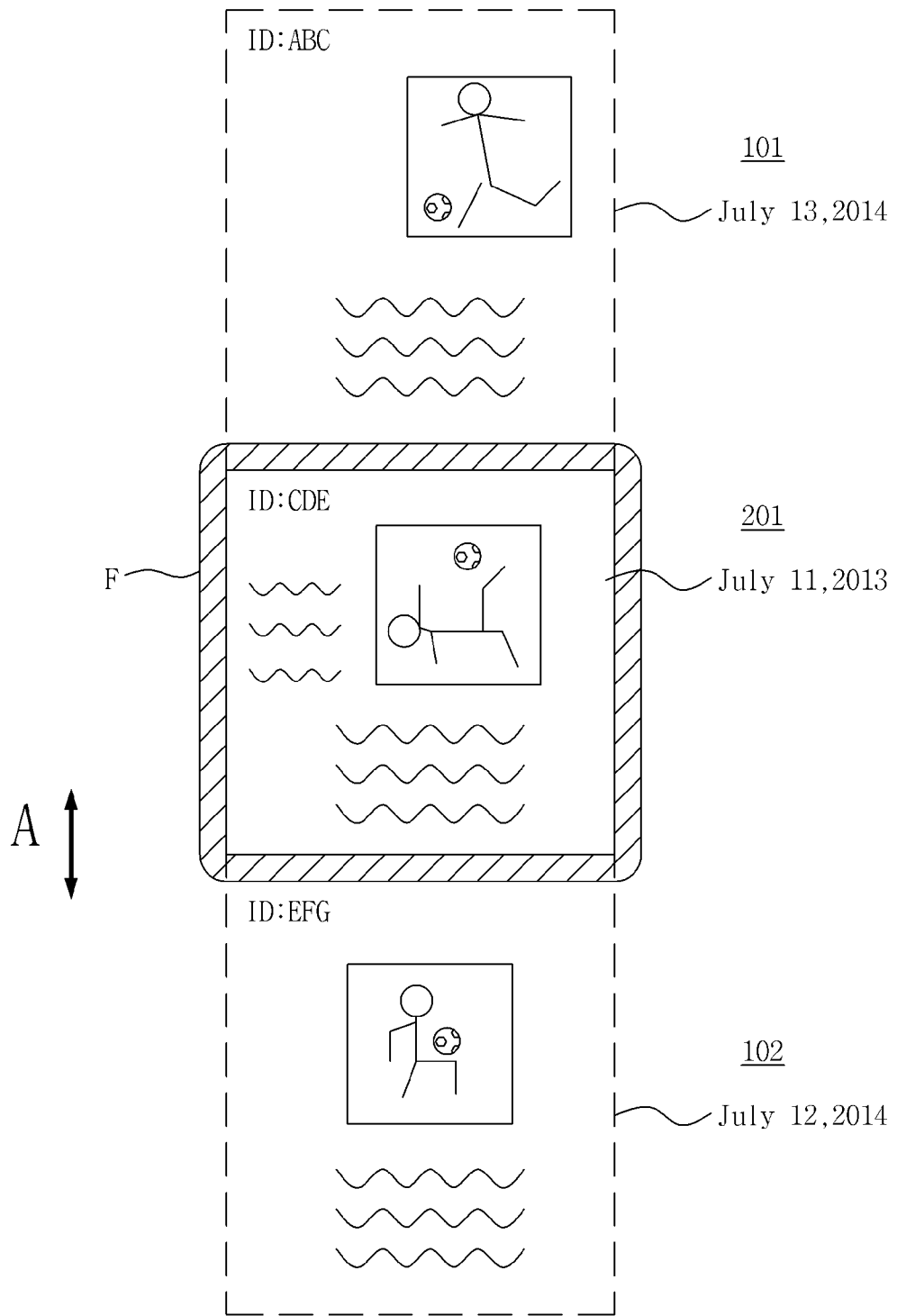
FIG. 5 illustrates rearranged content items of periodically occurring but having different date events on a timeline of the SNS, in which one of the content items is visible on the mobile device, according to another embodiment of the present invention.

Regarding the predetermined criteria, there may be, for instance, two different situations where how the second post 201 is identified and determined. The first situation is when an event annually occurs on a same date such as a birthday, Christmas, etc. Thus, in this case, the first post 101 and second post 201 have a same posting date with a different year. The second situation is when an event periodically occurs but the date of the event is not fixed, such as World Cup, Movie Festival, Grammy Awards Ceremony, etc. Thus, in this case, the first post 101 and second post 201 may have a different date and month. Referring to FIGS. 2A, 2B, and 3, a solution for the first situation above will be described. Referring to FIGS. 4 and 5, another solution for the second situation above will be described.

FIG. 2A illustrates a conventional timeline with content items that are sequentially displayed in a SNS. FIG. 2B illustrates rearranged content items on a timeline of the SNS. It is assumed that as of Dec. 26, 2014, a user chooses the first post 101 for Christmas which is an annual holiday on December 25. If a predetermined criteria is set to identify an annually occurring event content items in the SNS, it identifies the second post 201 that has the same date as December 25 with the different year, 2013. For example, the first range was set for five (5) days. Accordingly, the first plurality of content items 102 include any postings posted between Dec. 21, 2014 to Dec. 25, 2014. Likewisely, the second plurality of content items 202 include any content items posted between Dec. 21, 2013 to Dec. 25, 2013. The first post 101 and the relocated second post 201 are used as a reference time point for rearranging the first plurality of content items 102 and second plurality of content items 202. Thus, the first plurality of content items 102 and second plurality of content items 202 are relocated and rearranged with respect to a reference time point of Dec. 25, 2014. In other words, although the second plurality of content items 202 is one year older than the first plurality of content items 102, the second plurality of content items 202 is displayed along with the first plurality of content items 102 as if the second plurality of content items 202 happened in a similar time or date with the first plurality of content items 102. It is advantageous because a user can make an easier comparison between the two groups of content items 102 and 202.

A user can view rearranged posts on the time line, in which the posts are not sequentially arranged. Referring to FIG. 3, in another embodiment, it is described how to display rearranged posts. FIG. 3 illustrates rearranged content items having a same date on a timeline, in which one of the content items is visible on the mobile device, according to another embodiment of the present invention.

Regarding the rearranged content items, for instance, if there are three posts 101a, 201a, and 101b having a same posting date of December 25, the three posts 101a, 201a, and 101b can be displayed in a sequential time order within the date. In other word, although the second post 201a has a posting year of 2013, the posting year is disregarded and a posting time of 9 P.M. of the second post 201a is considered for rearranging the three posts 101a, 201a, and 101b within the date of December 25. The three posts 101a, 201a, and 101b have posting times 10 P.M., 9 P.M., and 8 P.M. respectively, and thus rearranged accordingly.

The user can navigate among the three posts 101a, 201a, and 101b by a touch screen or a scroll button according to a direction of arrow A being depicted in FIG. 3. The user can see at least one of the three posts 101a, 201a, and 101b via a device display F.

Referring to FIGS. 4 and 5, according to another embodiment of the present invention, the second situation above, in which an event periodically occurs but the date of the event is not fixed, will be further described below. FIG. 4 illustrates how to rearrange World Cup content items on a timeline of the SNS. 2014 World Cup Closing Ceremony was held on Jul. 13, 2014. 2010 World Cup Closing Ceremony was held on Jul. 11, 2010. World Cup occurs every four years but does not have a fixed date. The last date of each event can be used as a reference time point for rearranging each event so that a user can easily make a comparison between two World Cups.

A posting date of the first post 101 is Jul. 13, 2014. A first range is for five (5) days. A first plurality of content items 102 are content items posted between Jul. 9, 2014 and Jul. 13, 2014. A posting date of the second post 201 is Jul. 11, 2013. A second plurality of content items 202 are content items posted between Jul. 6, 2010 and Jul. 11, 2010. Thus, each of the first and second plurality of content items 102 and 202 is relocated on a timeline according to a time difference with respect to each of the reference time point, which is either Jul.

13, 2014 or Jul. 11, 2010. Thus, regardless of the date, month, or year, each of the first and second plurality of content items 102 and 202 can be relocated away from the reference time point on the timeline in proportional to the relative time difference. In this way, the user can see the two world cup content items at a same time as it develops in a timeline regardless of their year differences.

FIG. 5 illustrates rearranged content items of an event, periodically occurring but not having a fixed date, on a timeline of the SNS, in which one of the content items is visible on the mobile device. Regarding the rearranged posts, as illustrated in FIG. 5, for exemplary purpose only, there are three posts 101, 201, and 102 having different posting dates of Jul. 13, 2014, Jul. 11, 2013, and Jul. 12, 2014 respectively. Each of the three posts 101, 201, and 102 is rearranged according to its time difference with respect to its reference time point, which is either Jul. 13, 2014 or Jul. 11, 2013 and is displayed accordingly. The second post 201 of Jul. 11, 2013 needs to be relocated to a position of the first post 101 of Jul. 13, 2014. Between the first post 101 and second post 201, any post having earlier time can be displayed first. According to another predetermined rule, recent year's posting, the first post 101 of Jul. 13, 2014, can be displayed first and then the second post 201 can be displayed.

The second post 201 has a posting date of Jul. 11, 2013, which happened about a year earlier than next one, one of the first plurality of posts 102, of Jul. 12, 2014, but is presented ahead on the timeline. The user can navigate among the three posts 101, 201, and 102 by a touch screen or a scroll button according to a direction of arrow A being depicted in FIG. 5. The user can see at least one of the three posts 101, 201, and 102 via a device display F of the user's terminal.

Figure 6:
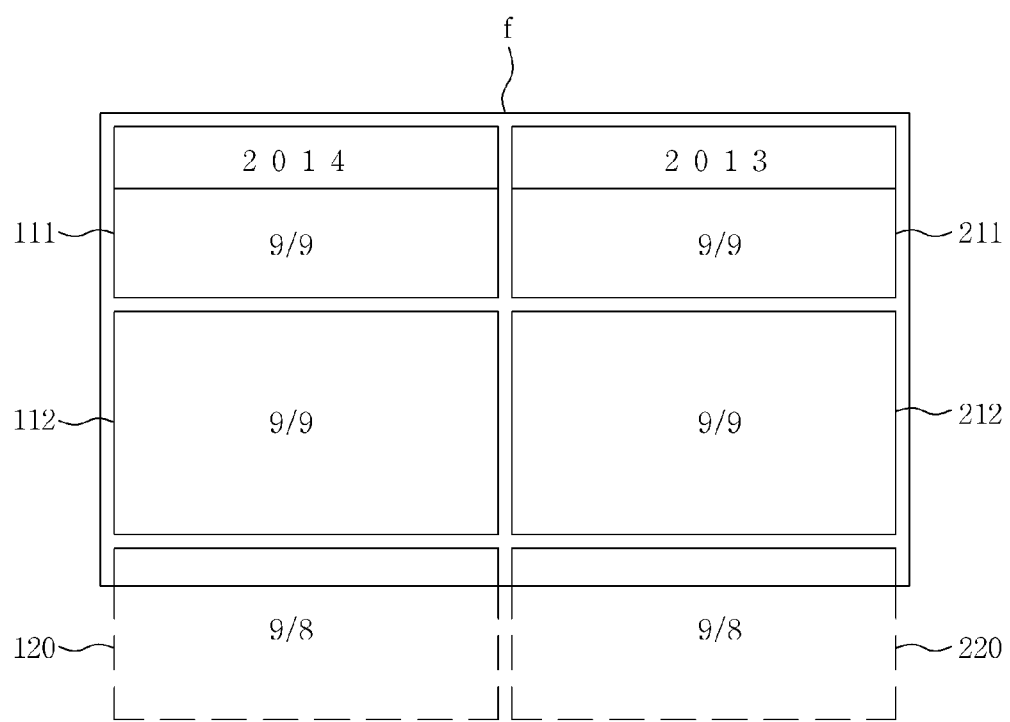
FIG. 6 illustrates rearranged content items in two columns on a timeline, in which some of the content items are visible on the mobile device, according to another embodiment of the present invention.

Referring to FIG. 6, another embodiment of the present invention will be described. FIG. 6 illustrates rearranged content items in two columns on a timeline, in which some of the content items are visible on the mobile device.

According to another embodiment of the present invention, the rearranged first group of content items 111, 112, and 120 and the rearranged at least one comparison group of content items 211, 212, and 220 are displayed in a parallel manner so that a user can make an easy comparison between the two groups. The rearranged first group of content items 111, 112, and 120 is displayed in a first column. The rearranged at least one comparison group of content items 211, 212, and 220 is displayed in at least one column adjacent to the first column of the mobile display device f. For an exemplary purpose only, FIG. 6 illustrates one comparison group of content items but a plural number of comparison groups can be displayed in at least one column adjacent to the first column. The first column can be the leftmost, rightmost, uppermost or lowermost column on the mobile display device f, in which the mobile display device is extended in a vertical or horizontal direction. Dotted lines as shown in FIG. 6 is invisible to the user. At least one content item of the first group is displayed with at least one content item of the at least one comparison group in accordance with at least one of time, date, month, and year in a parallel manner. For instance, referring to FIG. 6, there are two content items 111 and 112 on Sep. 9, 2014 and 211 and 212 on Sep. 9, 2013, respectively. Since a number of content items are same with one another, each of content items can be displayed in a parallel manner. At least one of time, date, month, and year can be used as a sorting reference.

Figure 7:
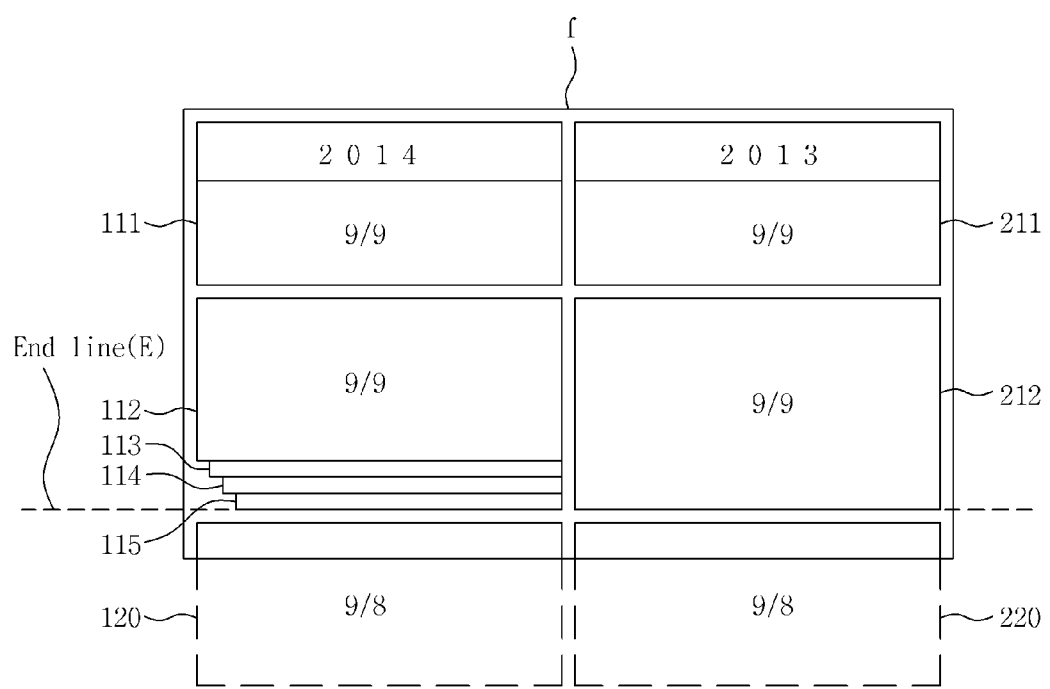
FIG. 7 illustrates rearranged content items in two columns on a timeline, in which at least one content item of the first group is displayed in an overlapped manner, according to another embodiment of the present invention.

FIG. 7 illustrates rearranged content items in two columns on a timeline, in which at least one content item of the first group is displayed in an overlapped manner, according to another embodiment of the present invention.

A total number of content items 111, 112, 113, 114, and 115 of the group having a date of September 9 is five (5). A total number of content items 211 and 212 of the comparison group having a date of September 9 is two (2). As shown in FIG. 7, the total number of the content items 111, 112, 113, 114, and 115 having a date of September 9 is greater than the total number of the content items 211 and 212 having a date of September 9, and the content items 111, 112, 113, 114, and 115 having a date of September 9 are displayed in an overlapped manner. In FIG. 7, three content items 113, 114, and 115 are located beyond content item 112. The first group and the comparison group having the same date of September 9 have a same end line E, which helps a user to identify the end of content items having the date of September 9.

Although not illustrated in figures, when a total number of content items of the comparison group is greater than a total number of content items of the first group having a same time, date, month, or year, and at least one content item of the comparison group of content items is displayed in an overlapped manner. The first group of content items and the comparison group of content items having the same time, date, month, or year have a same end line thereof.

Figure 8:
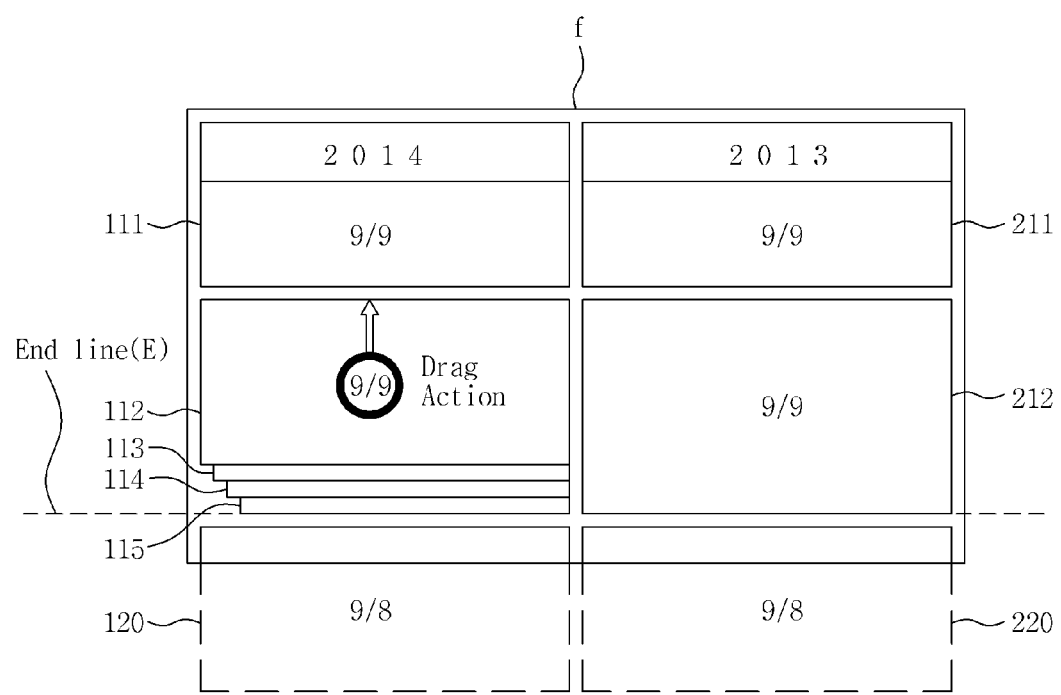
FIG. 8 illustrates when a user applys a drag action on at least one content item of the first group in FIG. 7 and how a plurality of item contents having a same date are displayed.

FIG. 8 illustrates when a user applies a drag action on at least one content item of the first group in FIG. 7 and how a plurality of content items having a same date is displayed.

When a user navigates at least one content item of the first group displayed in an overlapped manner, the content items of the first group are displayed one by one. In other words, when a user drags the first group of content items, a content item of the first group with a reference number 113 appears on the top as the one with a reference number 112 moves upward. Each of the content items 113, 114 and 115 of the first group appears on the top one by one as the content item displayed on the top moves forward. While each of the content items 113, 114 and 115 of the first group appears on the top one by one, the content item 212 of the comparison group does not move.

After the last content item 115 of the first group having a date of September 9 appears on the top and has a same end line with an adjacent content item 212 having the same date, the last content item 115 of the first group and the content item 212 of the comparison group move upward together.

Figure 9:
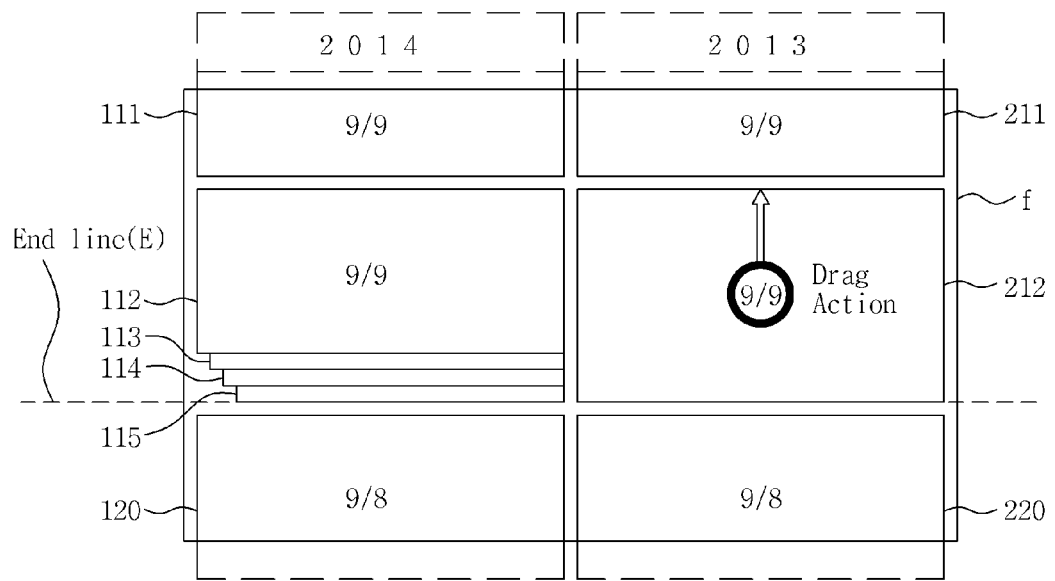
FIG. 9 illustrates when a user applys a drag action on at least one content item of the at least one comparison group in FIG. 7.

FIG. 9 illustrates when a user applies a drag action on at least one content item of the at least one comparison group in FIG. 7. Referring to FIG. 9, when a user drags one of the content items 211 and 212 of the comparison group upward, a plurality of content items of the first group 112, 113, 114, and 115 will be moved upward together.

Figure 10:
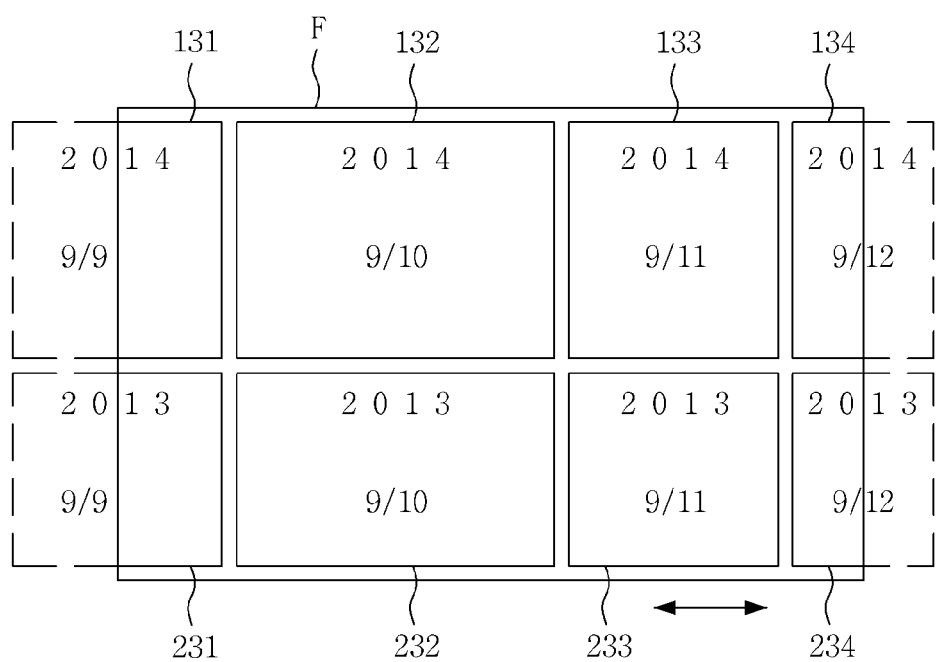
FIG. 10 illustrates rearranged content items in two rows on a timeline of a display panel extending in a vertical direction.

FIG. 10 illustrates rearranged content items in two rows on a timeline of a display panel extending in a vertical direction. The rearranged content items 131, 132, 133, 134 of the first group are displayed in a first row, and the rearranged content items 231, 232, 233, 234 of the comparison group are displayed in an adjacent row.

Figure 11:
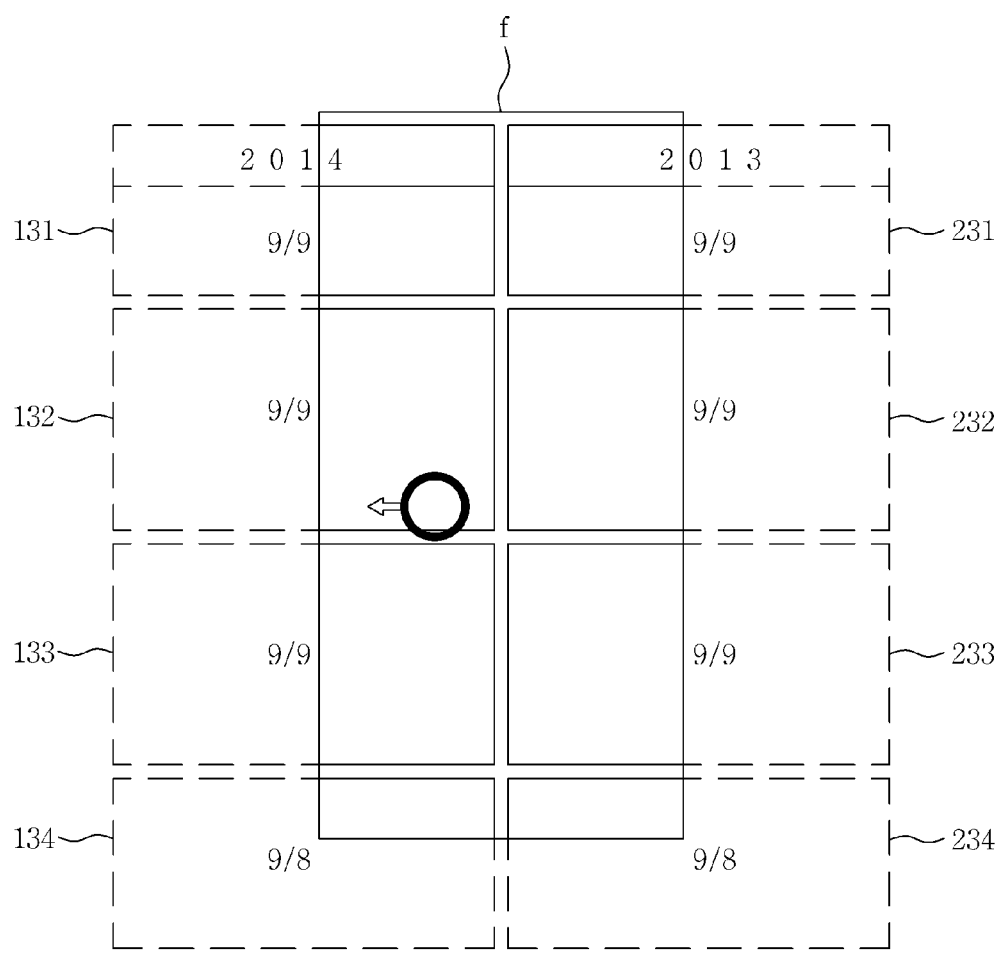
FIG. 11 illustrates rearranged content items in two columns on a timeline of a display panel extending in a horizontal direction.

FIG. 11 illustrates rearranged content items in two columns on a timeline of a display panel extending in a horizontal direction. When a user scrolls one of content items 131, 132, 133, and 134 of the first group and content items 231, 232, 233, and 234 of the comparison group in one direction, the first group and the comparison group move together in the same direction. Another user can navigate between the rearranged first group 131, 132, 133, and 134 and the rearranged comparison group 231, 232, 233, and 234 on the mobile display device f.

A conventional SNS provides a way of communication that another user can like, comment, share or follow an individual post of a user. However, the conventional SNS does not provide a way of communication that another user can like, comment, share, or follow a group of content items itself, not individual post. Some SNS applications on smartphones or websites allow a folder/list service that a user can collect a plurality of posted content items in the folder/list. For example, the user can create a folder/list under his/her own account of a SNS and can collect a plurality of content items thereunder. However, another user still cannot comment, share, and follow the group of the content items as an object of SNS communication. In other word, the conventional SNS does not provide a service that users are able to use a group of content items as a communication building block or as a basic unit for exchanging, commenting, following, adding, deleting, liking, or sharing subject. IMYMI SNS provides a card function to solve this problem, and referring to FIG. 12, the card function will be described in detail below.

Figure 12:
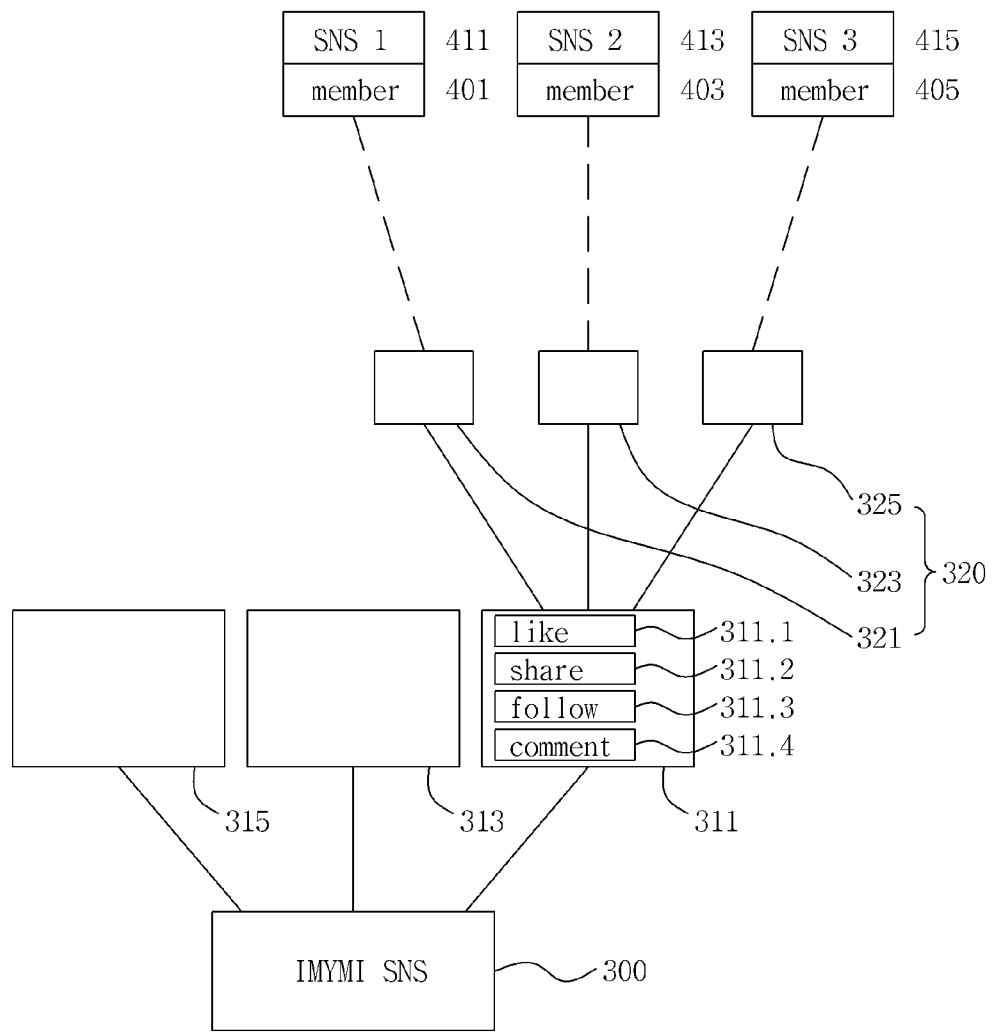
FIG. 12 illustrates a brief block diagram of a hierarchy structure of a card in IMYMI SNS, in accordance with another embodiment.

FIG. 12 illustrates a brief block diagram of a hierarchy structure of a card in IMYMI SNS 300, in accordance with another embodiment. IMYMI SNS 300 includes a plurality of cards 311, 313, and 315. The plurality of cards includes a first card 311, a second card 313, and a third card 315. Three cards 311, 313, and 315 are described herein for exemplary purposes only and the number of cards is not limited thereto.

Here, a term "member" refers to a person who uses SNSs, produces content items, and belongs to a card so that the member's content item is presented on the card. A term "user" refers to a person who uses IMYMI SNS, and also create, follow, share, and/or comment on the card. The member and user can be the same person or different person. A term "curator" refers to a person who uses IMYMI SNS and creates a card and maintain the card.

Each card 311, 313, and 315 can have a plurality of members. For instance, as depicted in FIG. 12, the first card 311 has a first member 401, a second member 403, and a third member 405 from a first SNS 411, a second SNS 413, and a third SNS 415 respectively. The first card 311 can include a search term or a certain condition so that the first card 311 collects a plurality of posts 320 from the first, second, and third members 401, 403, and 405 according to the search term or the condition, and displays the same to another user. A function of the first card 311 will be further described below.

As a user becomes connected with a large number of other users of SNSs, the user may wish to view certain content items according to the user's own criteria. For example, a user may have close friends, casual acquaintances, college roommates, co-workers, professional contacts, and family members as connections on various SNSs. Delineating the boundaries between these connections is desirable because, for instance, the user may wish to collect content items from close friends only from various SNSs. In this case, the user's own criteria is close friends and the user may create a new group of connections for the close friends. Now, the new group of connections for close friends is referred to as the first card 311. Each card 311, 313, and 315 can have a different purpose, search term, condition or criteria.

The user can use various types of SNS services, including but not limiting to, Facebook, Instagram, Twitter, and/or Kakaotalk. A new group of connections for the close friends could be a subset of the entire set of the user's connections of the user's various SNSs. In one embodiment, the new group of connections for close friends, otherwise known as the first card 311, may be related to a plural number of members 401, 403, and 405 from various SNSs 411, 413, and 415. The first card 311 can include a group of members 401, 403, and 405 that provide content items or posts 321, 323, and 325.

The first card 311 comprises a plurality of members. A curator of the card can create a card with a certain condition or search term. For example, the curator may be interested in friends who post content items in SNSs. The first card 311 includes a plurality of members 401, 403, and 405 such as people or pages (i.e., non-people entities such as STARBUCKS or NFL) and the curator can add a new member, and provide a search term such as "Movie Festival." In this case, the first card 311 can collect the plurality of content items 320 related to "Movie Festival." The plurality of content items 320 can include the first content item 321 from the first SNS 411, the second content item 323 from the second SNS 413, and the third content item 325 from the third SNS 415. The first card 311 includes information related to members 401, 403, and 405 and its own criteria or search term "Movie Festival." Thus, the first card 311 conducts a search with the search term "Movie Festival," among content items posted by members 401, 403, and 405 of the first card 311 in their respective SNSs. Another user can like 311.1, share 311.2, follow 311.3, and comment 311.4 on the first card 311. A "like" is another user's declared interest in a post. IMYMI SNS allows another users to "like" the card indicating a positive approval or interest in "the card."

For instance, users who follow the first card 311 receive a plurality of content items 320 from the members 401, 403, and 405 of the first card 311. In one embodiment, a user of IMYMI SNS is interested in a movie festival and believes members 401, 403, and 405 of the first card 311 are authoritative in a film industry so that the user would like to subscribe to a movie festival card and receive content items from the members 401, 403, and 405 of the movie festival. Thus, the first card 311 may be a considered channel of content items associated with a particular search term or condition that the curator created.

Figure 13:
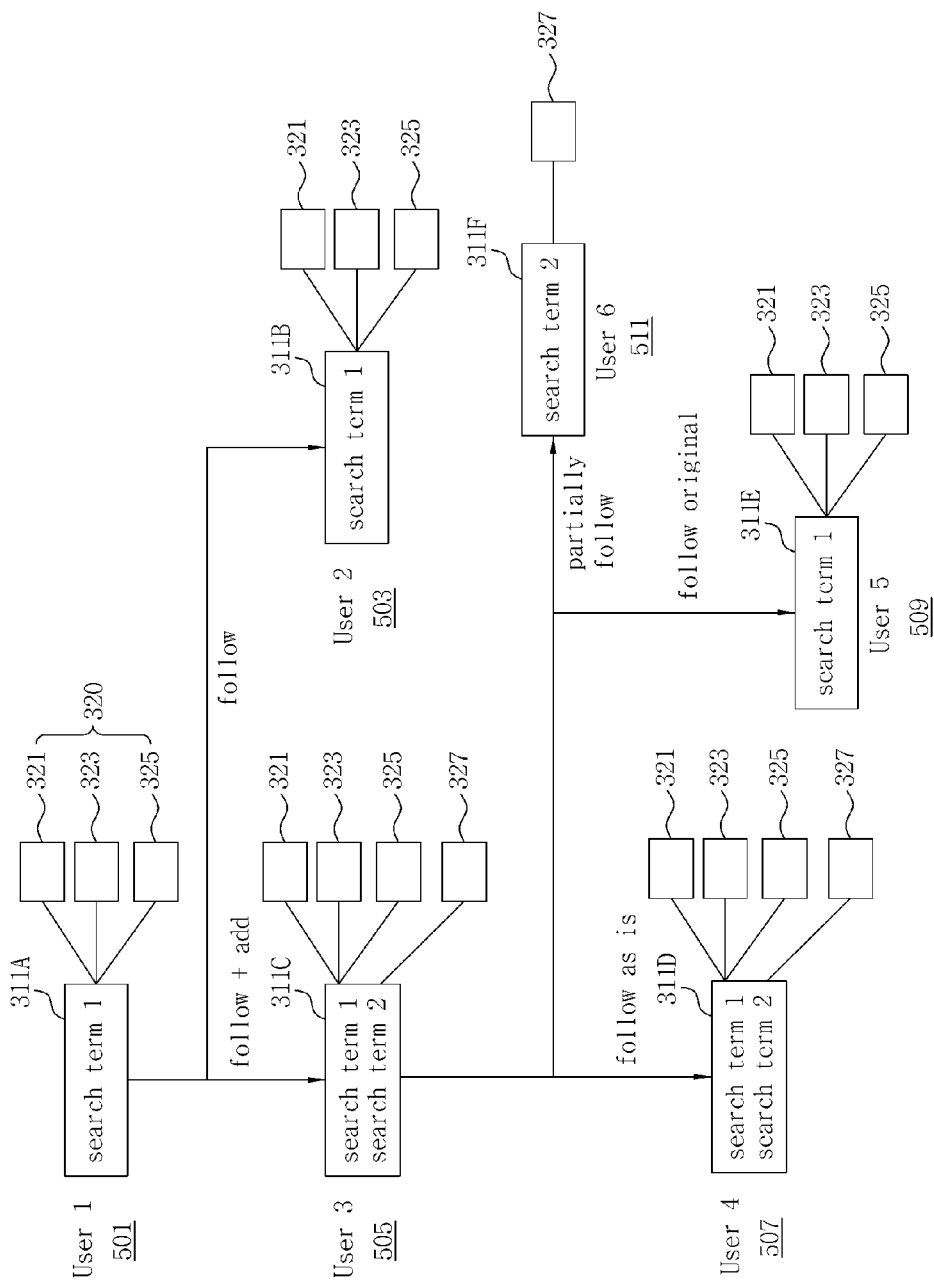
FIG. 13 illustrates a brief block diagram of plurality of users' use of a first card.

Referring to FIG. 13, how the users can use cards will be further described. FIG. 13 illustrates a brief block diagram of a plurality of users' use of the first card 311. A first user 501 is a curator and creates a first card 311A with a "search term 1." The first card 311A searches and collects a plurality of content items 321, 323, and 325, collectively denoted as 320.

If a second user 503 would like to follow the first card 311A, he/she can hit a button of "follow," which is depicted in FIG. 12 with a reference number 311.3. The second user 503 is following the first card 311A as is, and thus the first card 311B is displayed to the second user 503 with the same "search term 1" and with the same plurality of content items 320. Thus, different reference numbers "311A" and "311B" may carry and display the same content item.

If the first user 501 updates or changes the search term of the first card 311A, the changes will be reflected on the first card 311B of the second user 503. For example, if the first user 501 initially used a search term "Movie Festival" and later narrows its search scope down to "Venice Film Festival," the first card 311A shows different search results and they are also reflected on the second user's 503 first card 311B. The first user 501 can arbitrarily change the search term or slightly modify it and the changes can be automatically reflected to users who follow the card.

In another embodiment, the second user 503, otherwise referred to followers or subscribers, can bidirectionally suggest to change the first card 311A. For instance, the second user 503 can suggest to change the search term from "Music Festival" to "Venice Film Festival." The curator 501 can approve or disapprove the suggestion from the second user 503. Once the curator 501 approves the change from the second user 503, the change will be automatically reflected to the first card that the second user or other users are following.

In another embodiment, IMYMI SNS provides a predetermined condition to change the first card 311A. For instance, the second user 503 suggests to change the search term and discloses such suggestion to other users who follow the first card 311A. IMYMI SNS provides a vote function among the users who follow the first card 311A. Users can take a vote on such change or hit a button "Like" or "Disagree." According to a predetermined condition, for instance, if agreed more than 60% of a total subscribing users, the change can be accepted and automatically reflected on first card 311 of other users who follow the first card 311A.

In another embodiment, the second user 503 hits a "suggestion" button (not shown) located with comments on the first card 311A. Such suggestion is reported to the curator for approval. When there are plural numbers of suggestions, the curator can approve or disapprove such suggestions all together. An interface of suggestion is configured to be similar with an interface of creating a new card. The interface of creating a new card will be described further later.

In another embodiment, the second user 503 does not suggest any change of "search term 1" to the curator 501, but can modify "search term 1" for his or her own use. Such modification is reflected only to the first card 311B that the second user 503 is using and does not affect the original first card 311A that the curator created. In this case, no approval from the curator 501 is required.

Referring to FIG. 13, a third user 505 can follow the first card 311A. In this case, the third user 505 can add new search term 2 to his/her first card 311C. According to added "search term 2," the first card 311C further includes content item 327. Since the first card 311C includes "search term 1" and "search term 2," the first card 311C generates and displays the plurality of content items 321, 323, and 325 and content item 327. The third user 505 does not suggest to add the "search term 2" to the curator 501 but adds it for himself/herself. Thus, search term 2 is not reflected to the other first cards 311A and 311B.

A fourth user 507 can follow the first card 311C of the third user 505 as is. Thus, a first card 311D of the fourth user 507 displays the same content item with the first card 311C of the third user 505. A fifth user 509 can selectively follow the content item. Thus, if the fifth user 509 decides to follow the original first card 311A that the curator 501 created, a first card 311E of the fifth user 509 displays as same as the original first card 311A does. A sixth user 511 can selectively follow the first card 311C of the third user 505. Thus, the sixth user 511 can block or delete "search term 1," and leave "search term 2" only so that a first card 311F of the sixth user 511 can have the content item 327 of the third user 505 only associated with the "search term 2."

Figure 14:
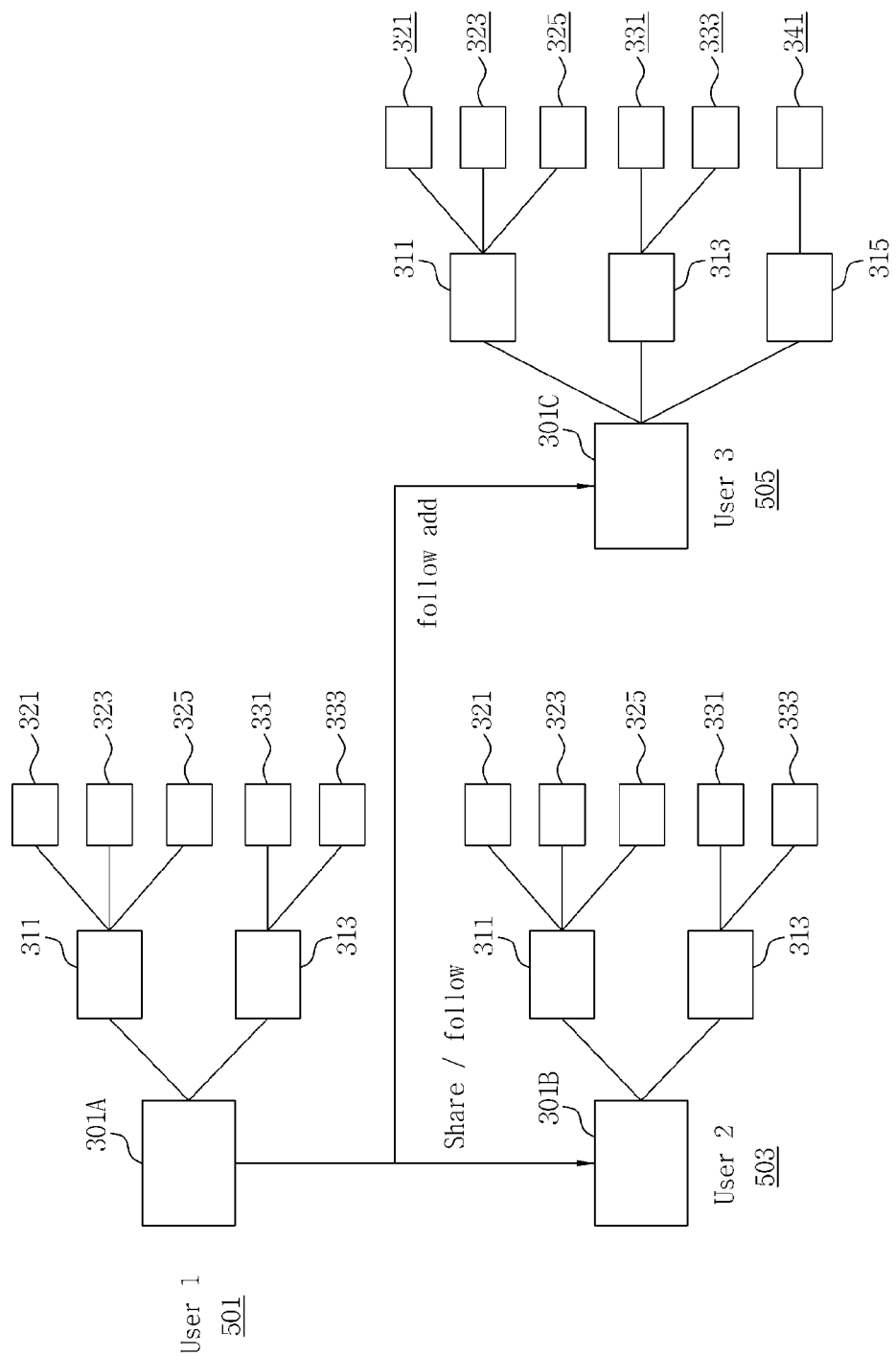
FIG. 14 illustrates a brief block diagram of a second level card including a plurality of cards.

Referring to FIG. 14, another embodiment of present invention will be described. FIG. 14 illustrates a brief block diagram of a second level card including a plurality of cards. The second level card 301A includes a first card 311 and a second card 313. The first card 311 includes content items 321, 323, and 325. The second card 313 includes content items 331 and 333. Referring to FIG. 14, a plurality of cards 311 and 313 constitute a first level card and belong to the second level card 301A. Just like the first card 311 and second card 313, the second level card 301A can be used as a basic unit for exchanging, commenting, following, adding, deleting, liking, or sharing cards. The second level card 301A can have its members (not shown) and search terms (not shown). Other users or subscribers of the second level card 301A can like, follow, share, and comment on the second level card 301A.

Referring to FIG. 14, a second user 503 can follow the second level card 301A of the curator 501 as is. Thus, a second level card 301B of the second user 503 displays the same cards with the original second level card 301A of the curator 501.

A third user 505 can follow the second level card 301A of the curator 501 and add a third card 315. A second level card 301C of the third user 505 displays additional card 341 as well. Although not depicted in FIG. 14, subscribing users also can suggest to change the search term of the second level card 301A of the curator 501 as explained above with respect to FIG. 13 or suggest to add/delete a card.

Figure 15:
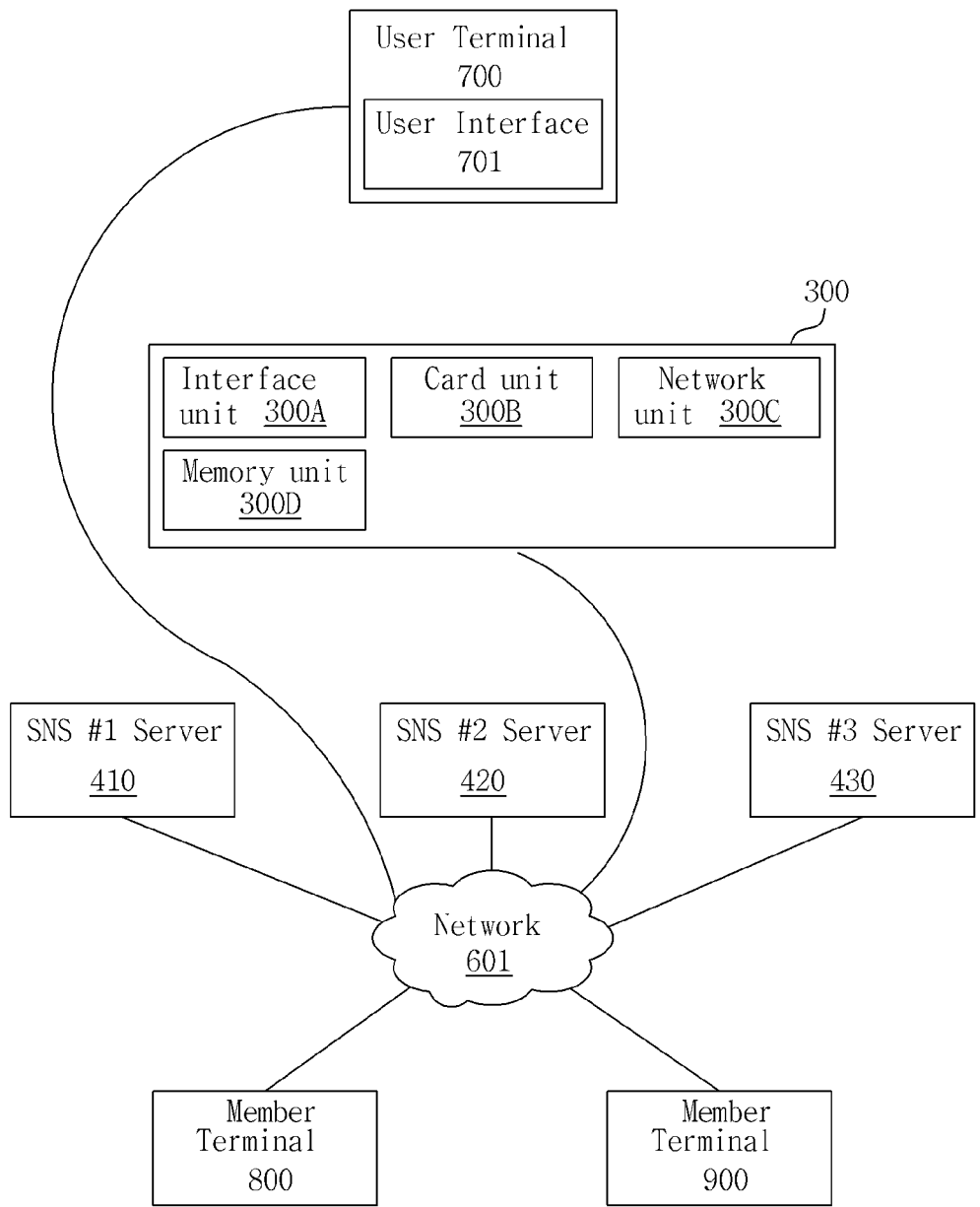
FIG. 15 illustrates a brief block diagram of a system for creating a card in IMYMI SNS, in accordance with another embodiment.

FIG. 15 illustrates a brief block diagram of a system for creating a card in IMYMI SNS, in accordance with another embodiment. IMYMI SNS includes a interface unit 300A, a card unit 300B, a network unit 300C, and a memory 300D. IMYMI SNS is connected to a user terminal 700 via a network 601. The user terminal 700 includes a user interface 701. IMYMI SNS is also connected to a first SNS server 410, a second SNS server 420, a third SNS server 430, a first member terminal 800, and a second member terminal 900 via the network 601.

IMYMI SNS 300 includes the interface unit 300A. The interface unit 300A allows users of IMYMI SNS to interact with IMYMI SNS using the user interface 701. When users request information from IMYMI SNS 300, the interface unit 300A dispatches the requested information to users in a format that can be displayed through the user terminal 700. For example, when a user requests the content items of the card from IMYMI SNS 300, the interface unit 300A may send content items from various SNSs server 410, 420, and 430 to the user terminal 700 that are configured to be displayed on the device. Depending on the type of information requested by a user, the interface unit 300A may send content items according to a certain condition or search term to the user terminal 700.

The card unit 300B manages the card generation process. The card unit 300B includes many different types of card generators configured to generate cards according to the user's instruction. The generated card information are stored in the memory 300D. The card unit 300B generates cards for users who are curators. Generally, the members of the card function as publishers that are responsible for content items posted in the card that is received by a subscribing user of the card.

The network unit 300C is configured to manage network communications in which streams of data frames are transmitted and received from to a plurality of SNS servers or SNS systems. The network unit 300C communicates with a plurality of SNS servers 410, 420, and 430 via the network 601. The network unit 300C is coupled to the memory 300D and stores data thereto.

The memory unit 300D is any type of medium that can stores programs (sequences of instructions) or data on a temporary or permanent basis for use in a digital electronic device. The memory unit 300D can includes Random-Access Memory (RAM), Dynamic Random-Access Memory (DRAM), Static Random-Access Memory (SRAM), Read Only Memory (ROM), Programmable Read-Only Memory (PROM), Erasable Programmable Read Only Memory (EPROM), Electrically Erasable Programmable Read-Only Memory (EEPROM) type memory or tape, magnetic disc or optical discs (CD-ROM and DVD ROM).

The user terminal 700 can execute a user interface 701 to allow the user to interact with IMYMI SNS. The user interface 701 allows the user to perform various actions or activities associated with IMYMI SNS and to view card information provided by IMYMI SNS. The actions performed using the user interface include sharing, following, adding, commenting, liking cards and the like. The information provided by IMYMI SNS that can be viewed using the user interface includes, images or videos posted by the members' connections from various SNSs.

The user interface 701 allows viewing users to view the information of cards of IMYMI SNS as well as general data related to news, sports, interests, etc. The information in the user interface 701 may be displayed to users in a different format. For example, the different format can include information and code in a web standard format presented through a browser. For example, a card may include a combination of any of XML, HTML, CSS, JavaScript, plaintext and Java sent from a SNS server. In another embodiment, a card may include data formatted for presentation through a mobile app or desktop application.

The card is an aggregation of data gathered by IMYMI SNS that is configured for display in various social networking system views (user interface views). For example, all content items related to a particular event, such as a movie festival, within a certain period of time, such as for two years 2013 and 2014, may be aggregated into one card.

The interactions between the user terminals 700 and IMYMI SNS 300 are typically performed via a network 601, for example, via the Internet. The network 601 enables communications among the user terminal 700, IMYMI SNS 300, and other various SNSs servers 410, 420, and 430. Member terminals 800 and 900 are also connected to the network 601. In one embodiment, the network uses standard communications technologies and/or protocols. Thus, the network can include links using technologies such as Ethernet, IEEE 802.11, worldwide interoperability for microwave access (WiMAX), 3G, 4G, LTE, digital subscriber line (DSL), asynchronous transfer mode (ATM), InfiniBand, PCI Express Advanced Switching, etc.

IMYMI SNS offers its users the ability to communicate and interact with other users of IMYMI SNS or other users of other SNSs. Users can join IMYMI SNS and then create a card including members of various SNSs. When users join IMYMI SNS, they may create a user account. The user account enables the user to maintain a persistent and secure identity on IMYMI SNS. The user account may include a user profile that stores details about the user, such as name, age, sex, etc. IMYMI SNS may provide a stream of data to a user to keep the user updated on the activities of the user's friends, as well as to inform the user about news and information related to the user's interests. This stream of data may include stories and story aggregations. The stories are collections of related data that are presented together to a user.

Figure 16A:
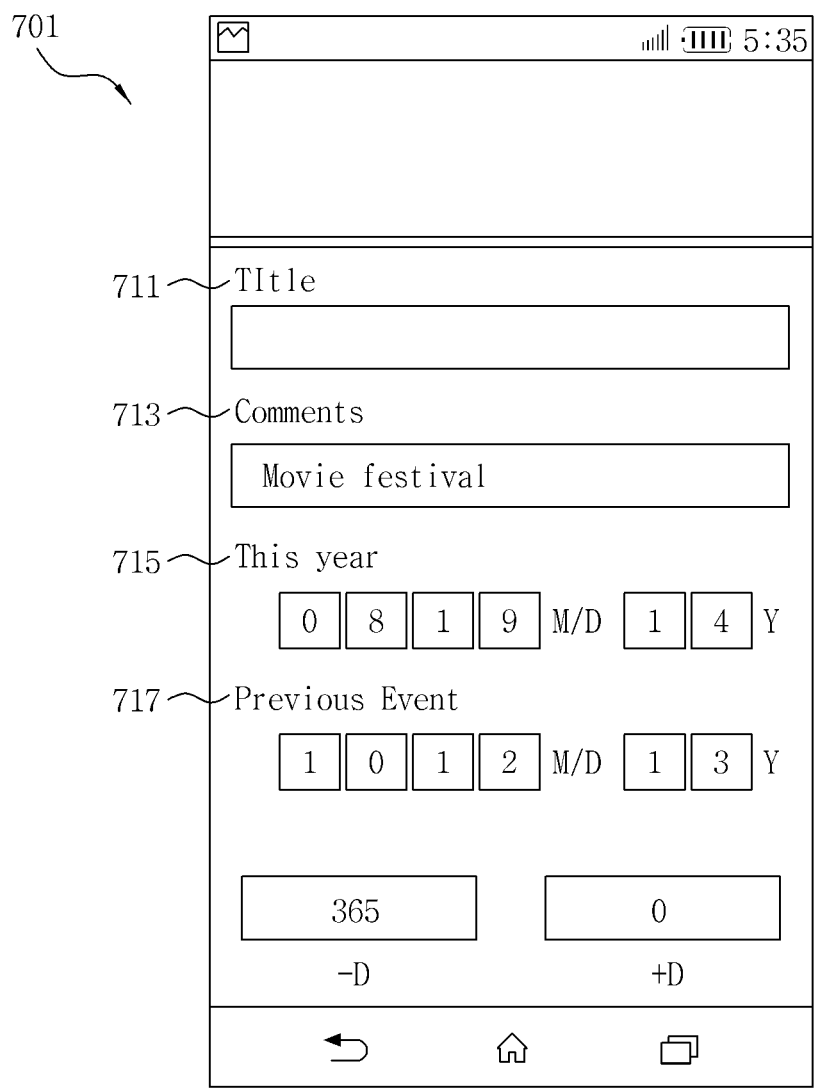
FIG. 16A illustrates one example of a user interface for setting a new card available on IMYMI SNS.
Figure 16B:
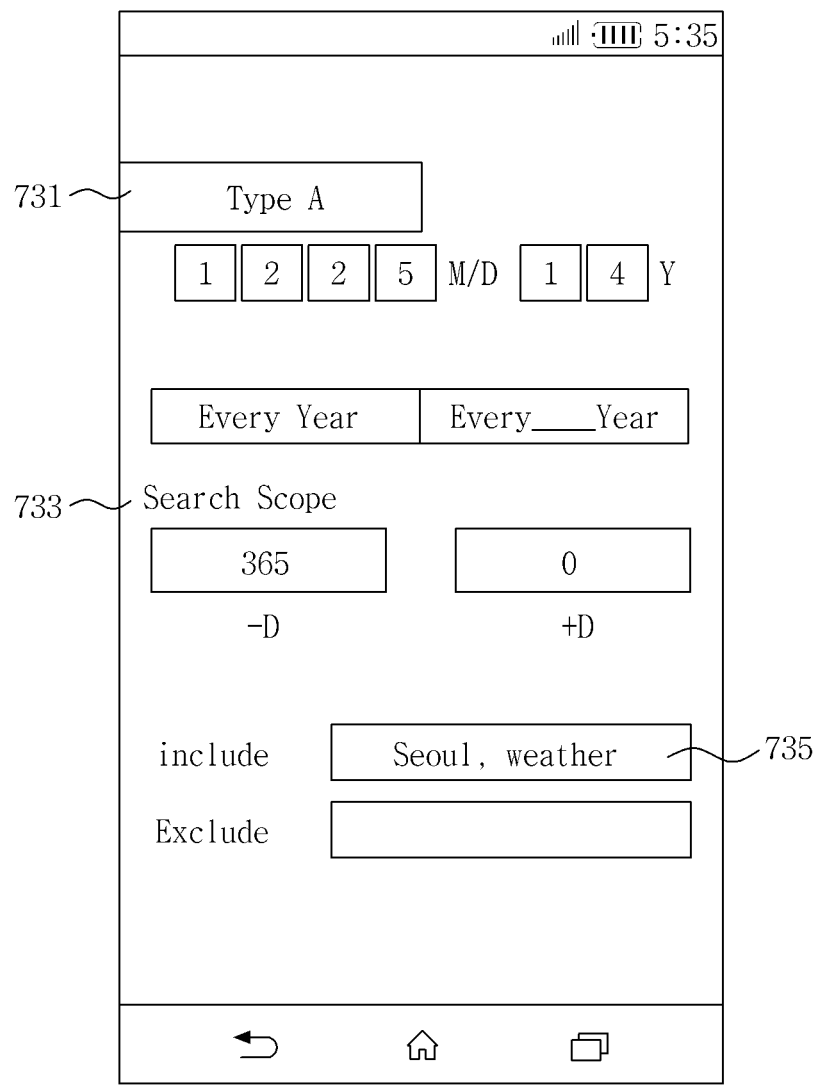
FIG. 16B illustrates another example of user interface for setting a new card available on IMYMI SNS.

Referring to FIGS. 10A, 10B, 10C, 10D, 10E, and 10F, it will be described as to how a curator creates a card and how the user can use the same. FIG. 16A illustrates one example of a user interface for setting a new card available on IMYMI SNS. When a curator creates a new card, the curator can provide a title 711, comments 713, period range 715 and 717. FIG. 16B illustrates another example of the user interface 701 for setting a new card available on IMYMI SNS. When a curator creates a new card, the curator can select a specific date 731, e.g., Christmas, and adjust a search scope. This search scope can be used as a first range as explained with respect to FIG. 2. The curator can add a search term 735 or exclude a specific search term. The card includes a plurality of content items associated with the search term 735 that the curator used. For example, a weather card includes a plurality of weather related notices generated from Twitter.

Figure 16C:
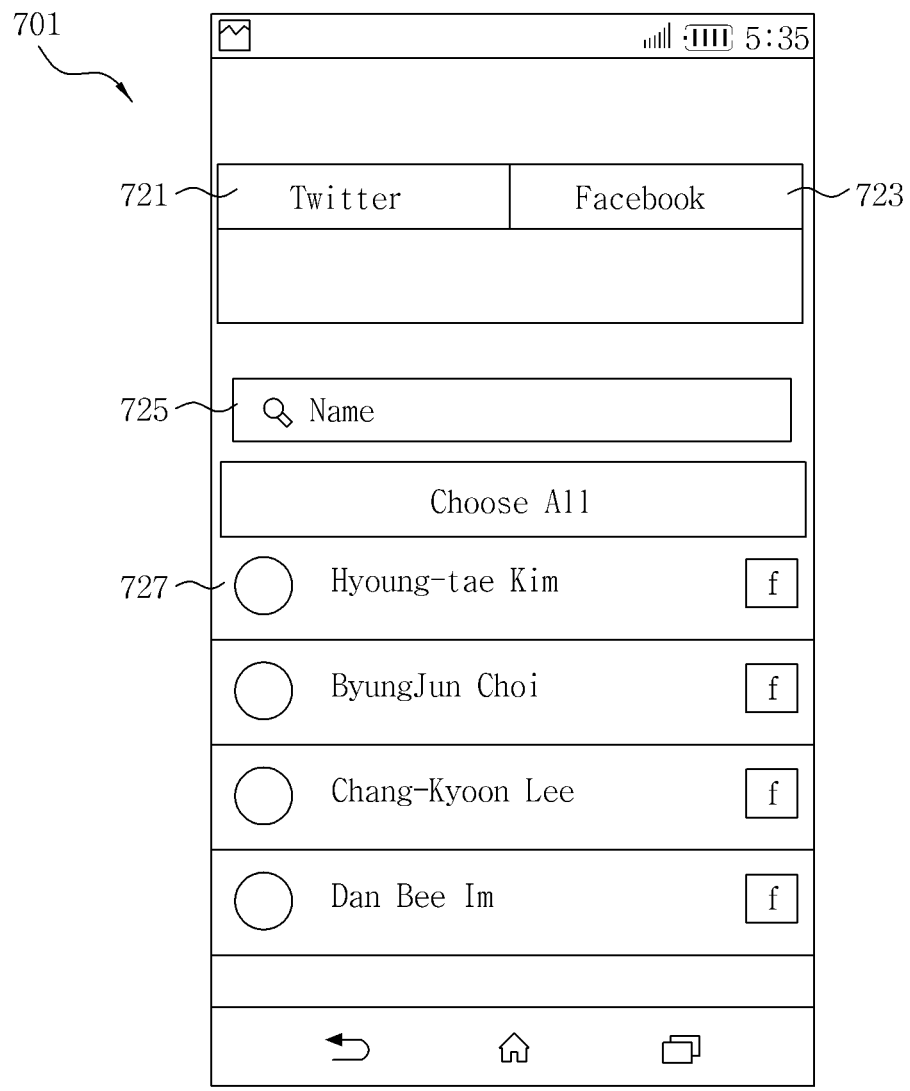
FIG. 16C illustrates another example of the user interface for setting a new card available on IMYMI SNS.

FIG. 16C illustrates another example of the user interface 701 for setting a new card available on IMYMI SNS. The curator can add new members 727 in SNSs. For instance, the curator can select a SNS either Twitter 721 or Facebook 723.

If the curator selects Facebook 723, the user interface 701 provides a list of users 727 in Facebook 723. The curator also can search a user's name 725 from Facebook 723 and add the user to the card as a member.

Figure 16D:
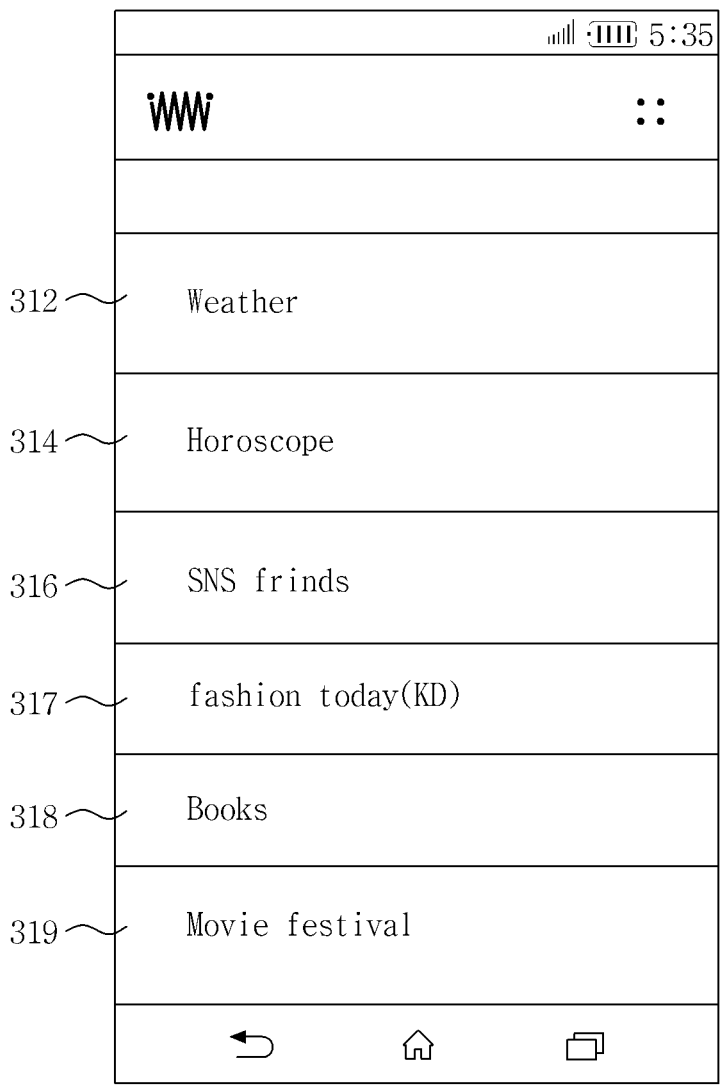
FIG. 16D illustrates one example of a list of cards available on IMYMI SNS.

FIG. 16D illustrates one example of a list of cards available on IMYMI SNS. Through the process explained with respec to FIGS. 10A, 10B, and 10C, new cards are created. Referring to FIG. 16D, a weather card 312, horoscope card 314, SNS friends card 316, fashion today card 317, books card 318, and movie festival card 319 are displayed.

Figure 16E:
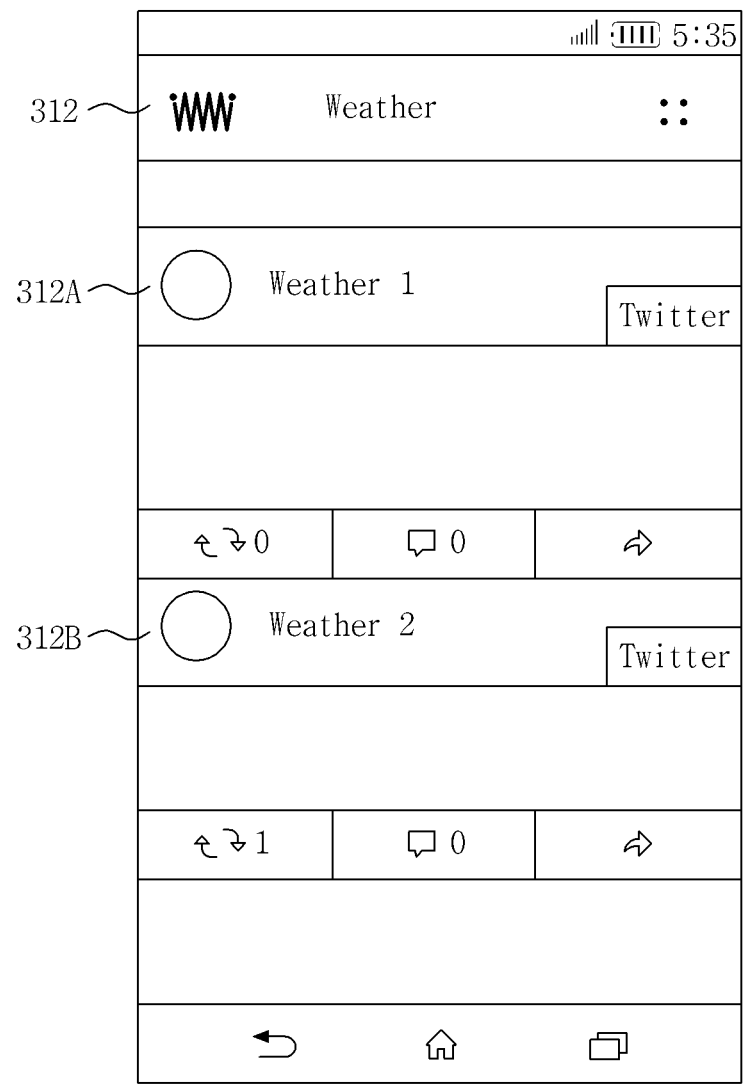
FIG. 16E illustrates one example of plurality of content items for a weather card available on IMYMI SNS.
Figure 16F:
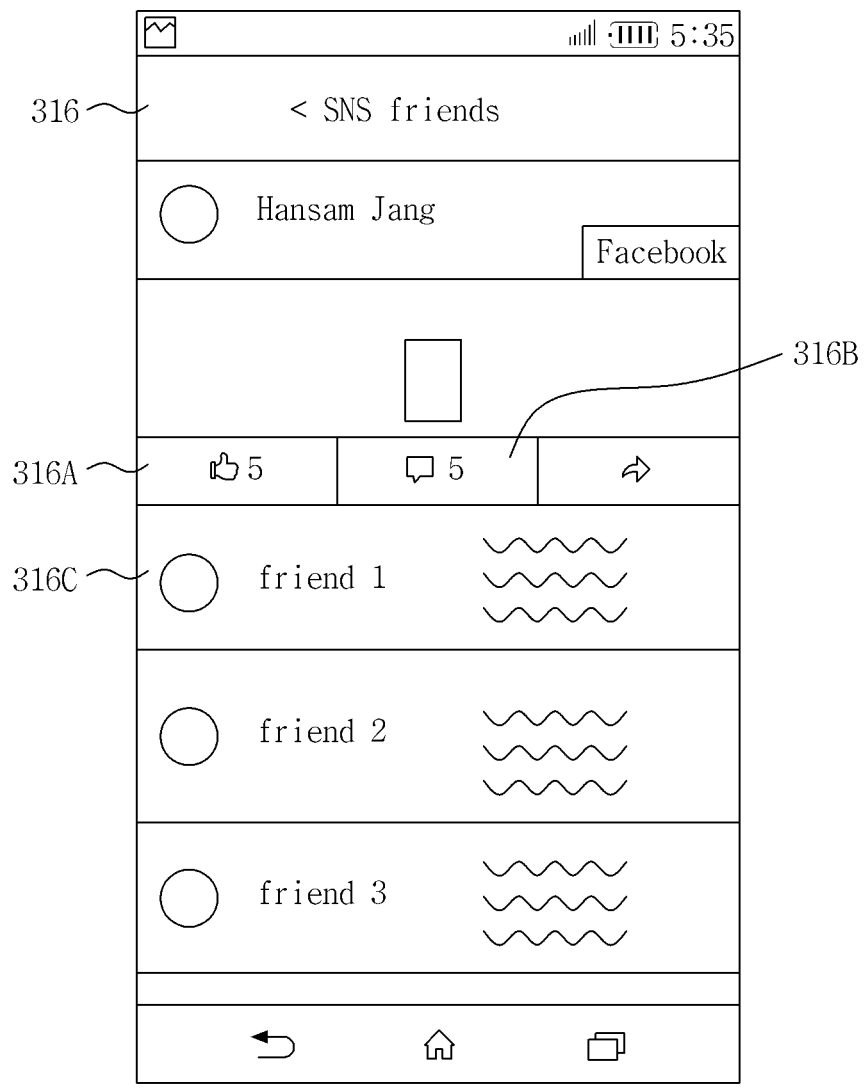
FIG. 16F illustrates one example of plurality of content items for a SNS friends card available on IMYMI SNS.

FIG. 16E illustrates one example of a plurality of content items for the weather card 312 available on IMYMI SNS. The weather card 312 includes a plurality of content items 312A and 312B related to weather. FIG. 16F illustrates one example of plurality of content items for the SNS friends card 316 available on IMYMI SNS. When a user opens the SNS friends card 316, the user can like 316A or comment 316B on the SNS friends card 316. Also, with the SNS friends card 316, the user can see the list of SNS friends 316C as well.

Figure 17:
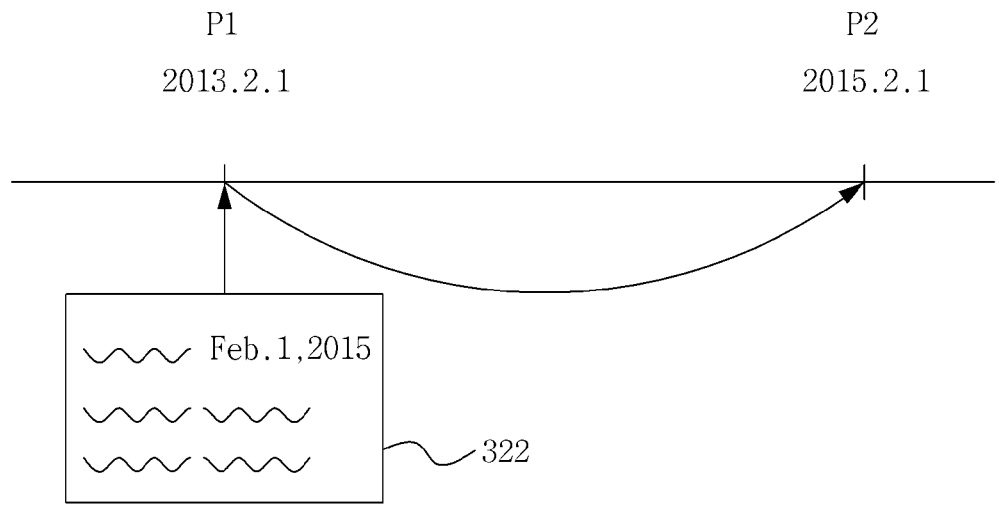
FIG. 17 illustrates a conceptual diagram of a time capsule function on a timeline, in accordance with another embodiment of the present invention.

FIG. 17 illustrates a diagram of time capsule function on a timeline, in accordance with the other embodiment of the present invention. A content item 322 is posted on Feb. 1, 2013, P1 on a timeline. The content item 322 includes a certain indication of date. The indication can be made in various ways. For instance, the content item 322 includes a date of "Feb. 1, 2015." The same date can be expressed in "2/1/2015," "Feb. 1, 2015," etc. IMYMI SNS stores such date in the memory unit 300D as shown in FIG. 15 and displays the content item 322 on Feb. 1, 2015. This time capsule is convenient, for instance, to remember an appointment. If a user leaves a post "Let's meet up Feb. 1, 2015" on the user's friend's SNS, then IMYMI SNS will automatically display the message in a timeline of IMYMI SNS on Feb. 1, 2015 to help the user remember such appointment. According to the user's setting, the message including a date can be displayed in a predetermined time earlier than the date in the message.

Figure 18:
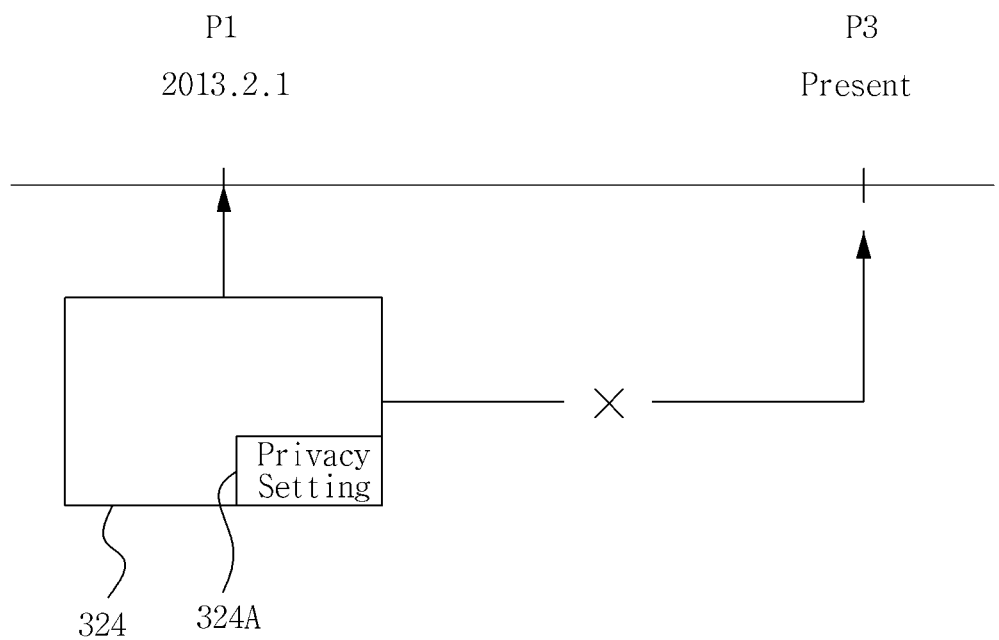
FIG. 18 illustrates a conceptual diagram of a privacy function on a timeline, in accordance with another embodiment of the present invention.

FIG. 18 illustrates a conceptual diagram of a privacy function on a timeline, in accordance with another embodiment of the present invention. A content item 324 is posted on Feb. 1, 2013, P1 on a timeline. A curator who created the content item 324 or card (not shown) can specify a privacy settings 324A. In one embodiment, the curator may specify that the content item is only available to a limited users, or only be viewable to the curator that created the card. Thus, the content item 324 is private to the curator and no one else except the curator may view the content item 324. Thus, if any other user uses a time capsule function as explained along with FIG. 17 or makes a comparison with a present and past event as explained along with FIGS. 1-5, the content item 324 will not be displayed because of its privacy settings 324A.

The foregoing description of the embodiments herein has been presented for the purpose of illustration, it is not intended to be exhaustive or to limit the invention to the precise forms disclosed. Persons skilled in the relevant art can appreciate that many modifications and variations are possible in light of the above disclosure. Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described. The embodiments described herein may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments herein is intended to be illustrative, but not limiting, of the scope of the invention, which is set forth in the following claims.

What is claimed is:

1. A computer implemented method comprising:
    receiving a first time range from a user of a social networking system, wherein the first time range includes a first reference time point;
    receiving at least one comparison time range, wherein each of the at least one comparison time range includes a comparison time point;
    identifying a first group comprising a plurality of first content items posted during the first time range;
    identifying at least one comparison group, each of the at least one comparison group comprising a plurality of comparison content items posted during the corresponding comparison time range;
    calculating a first time difference between each content item of the first group and the first reference time point;
    calculating at least one comparison time difference between each content item of the at least one comparison group and the comparison time point; and
    rearranging each content item of the first group away from the first reference time point at the first time difference,
    rearranging each content item of the at least one comparison group away from the first reference time point at the at least one comparison time difference; and
    displaying the rearranged each content item of the first group and the rearranged each content item of the at least one comparison group on a display panel.

2. The computer implemented method of claim 1, wherein the first reference time point and the comparison time point have a same date but a different year.

3. The computer implemented method of claim 1, wherein the first reference time point and the comparison time point have a different date and year.

4. The computer implemented method of claim 1, wherein the first time range and the at least one comparison time range have a same time period.

5. The computer implemented method of claim 1, wherein another user navigates between the rearranged first group and the rearranged at least one comparison group on the display panel.

6. A computer implemented method comprising:
    receiving a first time range from a user of a social networking system, wherein the first time range includes a first reference time point;
    receiving at least one comparison time range, wherein each of the at least one comparison time range includes a comparison time point;
    identifying a first group comprising a plurality of first content items posted during the first time range;
    identifying at least one comparison group, each of the at least one comparison group comprising a plurality of comparison content items posted during the corresponding comparison time range;
    calculating a first time difference between each content item of the first group and the first reference time point;
    calculating at least one comparison time difference between each content item of the at least one comparison group and the comparison time point; and
    rearranging each content item of the first group away from the first reference time point at the first time difference,
    rearranging each content item of the at least one comparison group away from the first reference time point at the at least one comparison time difference; and
    displaying the rearranged each content item of the first group and the rearranged each content item of the at least one comparison group on a display panel,
    wherein the first time range and the at least one comparison time range have a different time period,
    wherein the first time difference is recalculated in a proportion to a ratio of the first time difference to a total period of the first time range, and
    wherein the comparison time point is recalculated in a proportion to a ratio of the comparison time point to a total period of the at least one comparison time range.

7. The computer implemented method of claim 6, wherein the rearranged first group and the rearranged at least one comparison group are displayed in a parallel manner.

8. A computer implemented method comprising:
    receiving a first time range from a user of a social networking system, wherein the first time range includes a first reference time point;
    receiving at least one comparison time range, wherein each of the at least one comparison time range includes a comparison time point;
    identifying a first group comprising a plurality of first content items posted during the first time range;
    identifying at least one comparison group, each of the at least one comparison group comprising a plurality of comparison content items posted during the corresponding comparison time range;
    calculating a first time difference between each content item of the first group and the first reference time point;
    calculating at least one comparison time difference between each content item of the at least one comparison group and the comparison time point; and
    rearranging each content item of the first group away from the first reference time point at the first time difference,
    rearranging each content item of the at least one comparison group away from the first reference time point at the at least one comparison time difference; and displaying the rearranged each content item of the first group and the rearranged each content item of the at least one comparison group on a display panel, wherein the rearranged first group and the rearranged at least one comparison group are displayed in a parallel manner.

9. The computer implemented method of claim 8, wherein the rearranged first group is displayed in a first column, and the rearranged at least one comparison group is displayed in at least one column adjacent to the first column.

10. The computer implemented method of claim 8, wherein the rearranged first group is displayed in a first row, and the rearranged at least one comparison group is displayed in at least one row adjacent to the first column.

11. The computer implemented method of claim 8, wherein at least one content item of the first group is displayed with at least one content item of the at least one comparison group in accordance with at least one of time, date, month, and year in a parallel manner.

12. The computer implemented method of claim 11, wherein at least one content item of the first group is displayed together with at least one content item of the at least one comparison group having a same time, date, month, or year in a parallel manner.

13. The computer implemented method of claim 12, wherein when a number of the at least one content item of the first group is greater than a number of the at least one content item of the at least one comparison group having the same time, date, month, or year, the at least one content item of the first group is displayed in an overlapped manner so that the at least one content item of the first group and the at least one content item of the at least one comparison group having the same time, date, month, or year have a same end line thereof.

14. The computer implemented method of claim 13, wherein when another user navigates the at least one content item of the first group displayed in an overlapped manner, the at least one content item of the first group is displayed one by one until the last content item of the first group and the at least one content item of the at least one comparison group having the same time, date, month, or year have the same end line.

15. The computer implemented method of claim 12, wherein when a number of the at least one content item of the at least one comparison group is greater than a number of the at least one content item of the first group having the same time, date, month, or year, a number of the at least one content item of the at least one comparison group is displayed in an overlapped manner so that the at least one content item of the first group and the at least one content item of the at least one comparison group having the same time, date, month, or year have a same end line thereof.

16. The computer implemented method of claim 15, wherein when another user navigates the at least one content item of the at least one comparison group displayed in an overlapped manner, the at least one content item of the at least one comparison group is displayed one by one until the last content item of the at least one comparison group and the at least one content item of the first group having the same time, date, month, or year have the same end line.

17. The computer implemented method of claim 11, wherein when another user scrolls one of the first group and the at least one comparison group, both of the first group and the at least one comparison group move together.

18. The computer implemented method of claim 11, wherein at least one content item of the first group is displayed with at least one content item of the at least one comparison group in accordance with at least one of time, date, and month in a parallel manner.

* * * * *